United States Patent
Uwabata et al.

(10) Patent No.: US 6,534,920 B1
(45) Date of Patent: Mar. 18, 2003

(54) HORIZONTAL DEFLECTION CIRCUIT AND BIDIRECTIONAL HORIZONTAL DEFLECTION APPARATUS

(75) Inventors: Hideyo Uwabata, Takatsuki (JP); Masanobu Tanaka, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/887,091

(22) Filed: Jun. 25, 2001

(30) Foreign Application Priority Data

Jun. 27, 2000 (JP) ......................................... 2000-192753

(51) Int. Cl.[7] .......................... H01V 29/98; H01V 29/56
(52) U.S. Cl. .................................. 315/1; 315/371; 11/3
(58) Field of Search ................................ 315/1, 3, 370, 315/371, 367, 403; 340/814, 749, 741; 348/537, 556, 806; 331/20, 43

(56) References Cited

U.S. PATENT DOCUMENTS

| 3,879,637 | A | * | 4/1975 | Woodworth | ................. | 315/380 |
| 4,176,303 | A | * | 11/1979 | Babcock et al. | ............ | 315/371 |
| 4,181,874 | A | * | 1/1980 | Babcock | ..................... | 315/370 |
| 4,338,549 | A | * | 7/1982 | Haferl | ......................... | 315/393 |
| 4,463,288 | A | * | 7/1984 | Judd | ............................ | 315/367 |
| 4,612,482 | A | * | 9/1986 | Beamon et al. | ............. | 315/371 |
| 4,672,449 | A | * | 6/1987 | Kraus et al. | ................ | 315/389 |
| 5,712,532 | A | * | 1/1998 | Ogino et al. | ................... | 315/1 |

FOREIGN PATENT DOCUMENTS

| JP | 3-69273 | 3/1991 |
| JP | 6-6623 | 1/1994 |
| JP | 7-203238 | 8/1995 |
| JP | 8-172543 | 7/1996 |

* cited by examiner

*Primary Examiner*—Don Wong
*Assistant Examiner*—Chuc Tran
(74) *Attorney, Agent, or Firm*—Armstrong, Westerman & Hattori, LLP

(57) ABSTRACT

An amplitude control circuit controls the amplitude of a correction signal periodically changing in a parabolic form at vertical scanning intervals based on the level of an amplitude control signal and applies an amplitude controlled output signal to an adder. The adder adds the amplitude controlled correction signal to the output signal of a low-pass filter and applies the resulting signal to a retrace scanning control circuit and a trace scanning control circuit. The retrace scanning control circuit and the trace scanning control circuit apply a gate pulse to horizontal output FETs.

20 Claims, 15 Drawing Sheets

F I G. 1
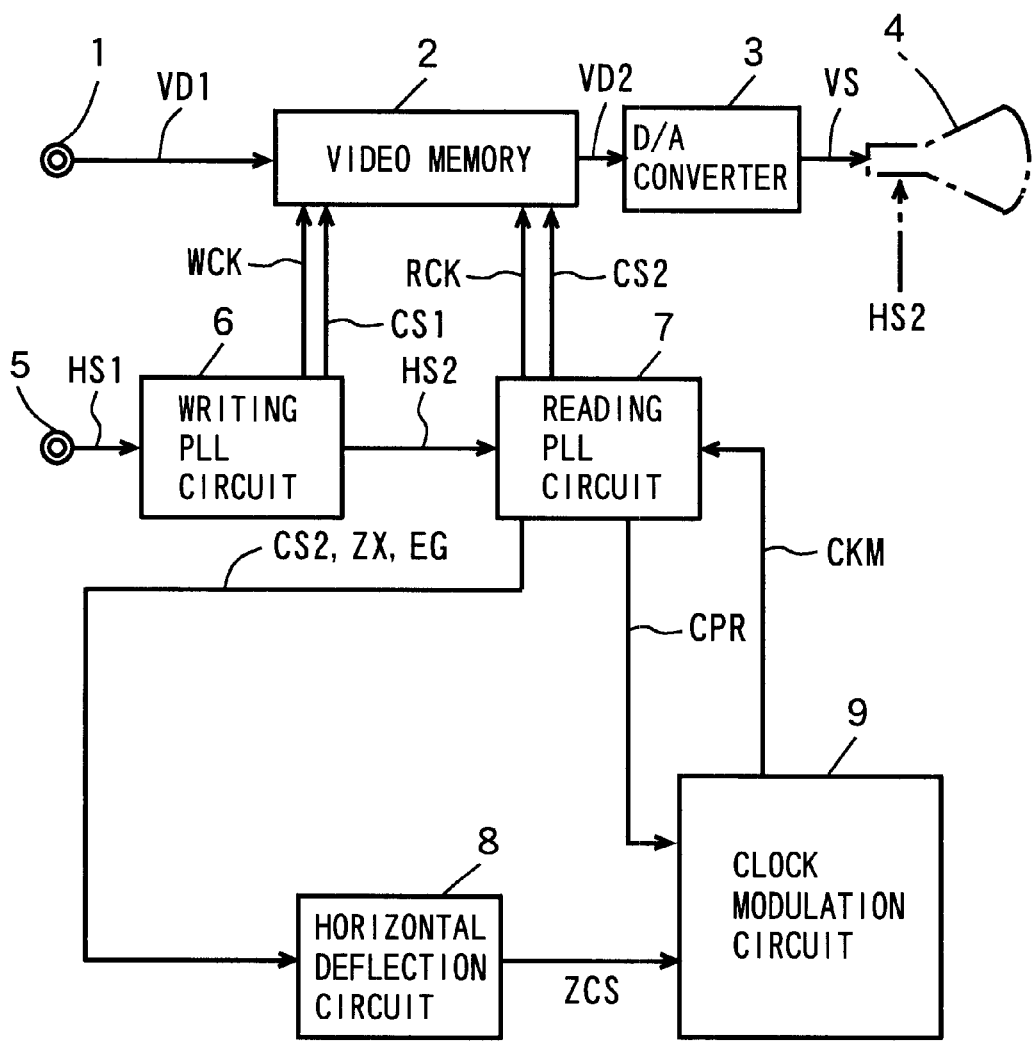

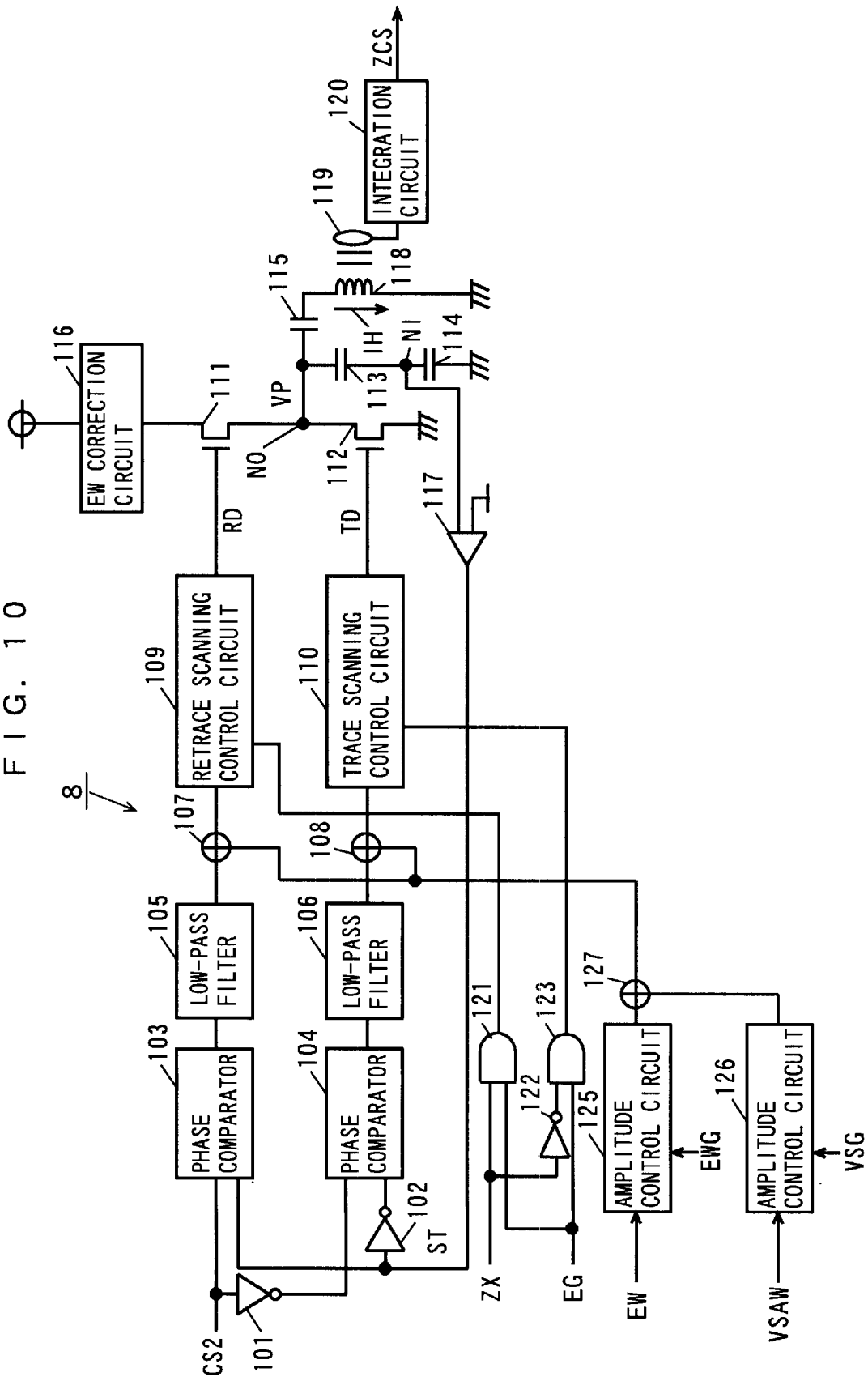

F I G. 1 1 PRIOR ART
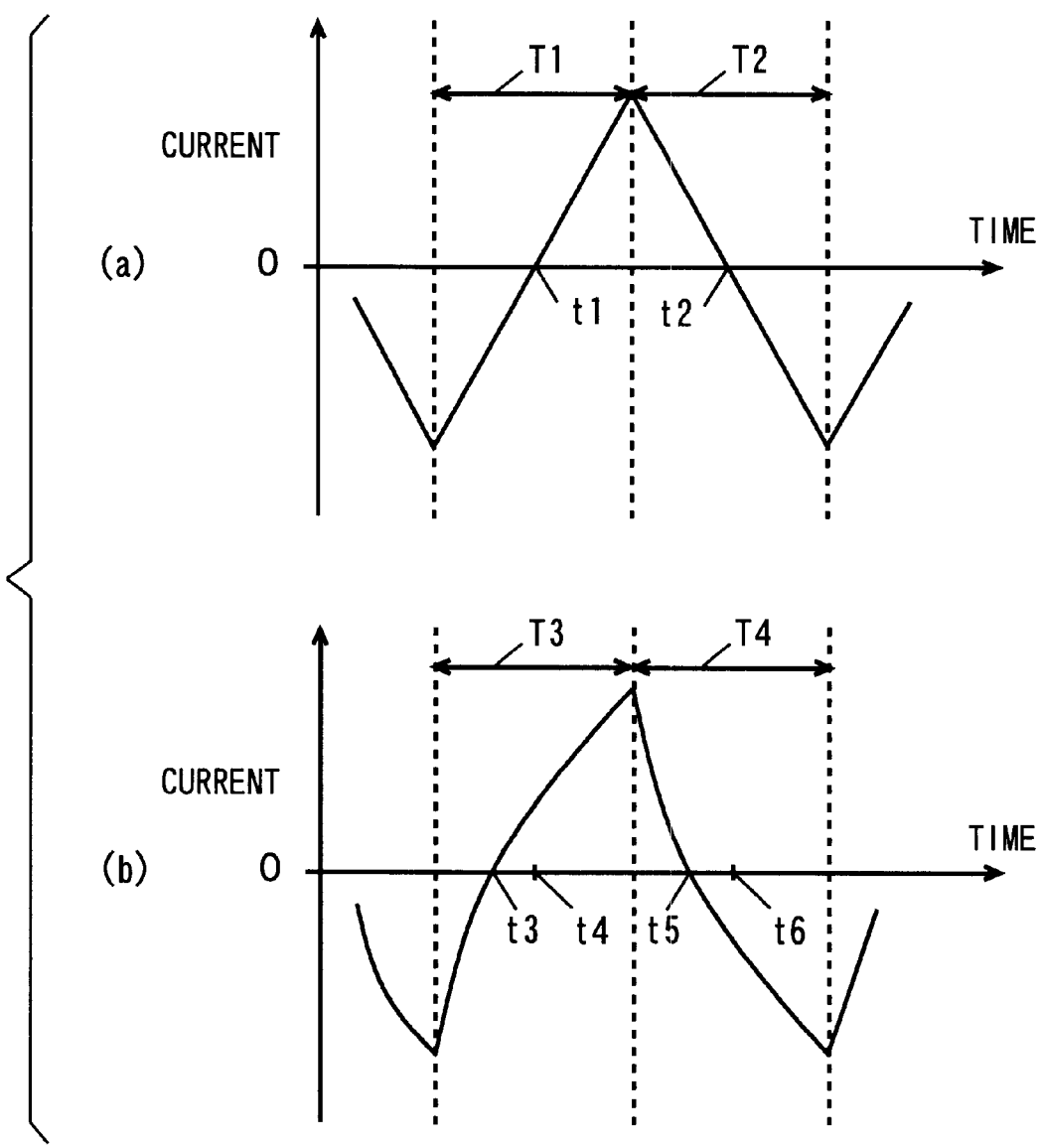

F I G. 1 2 PRIOR ART
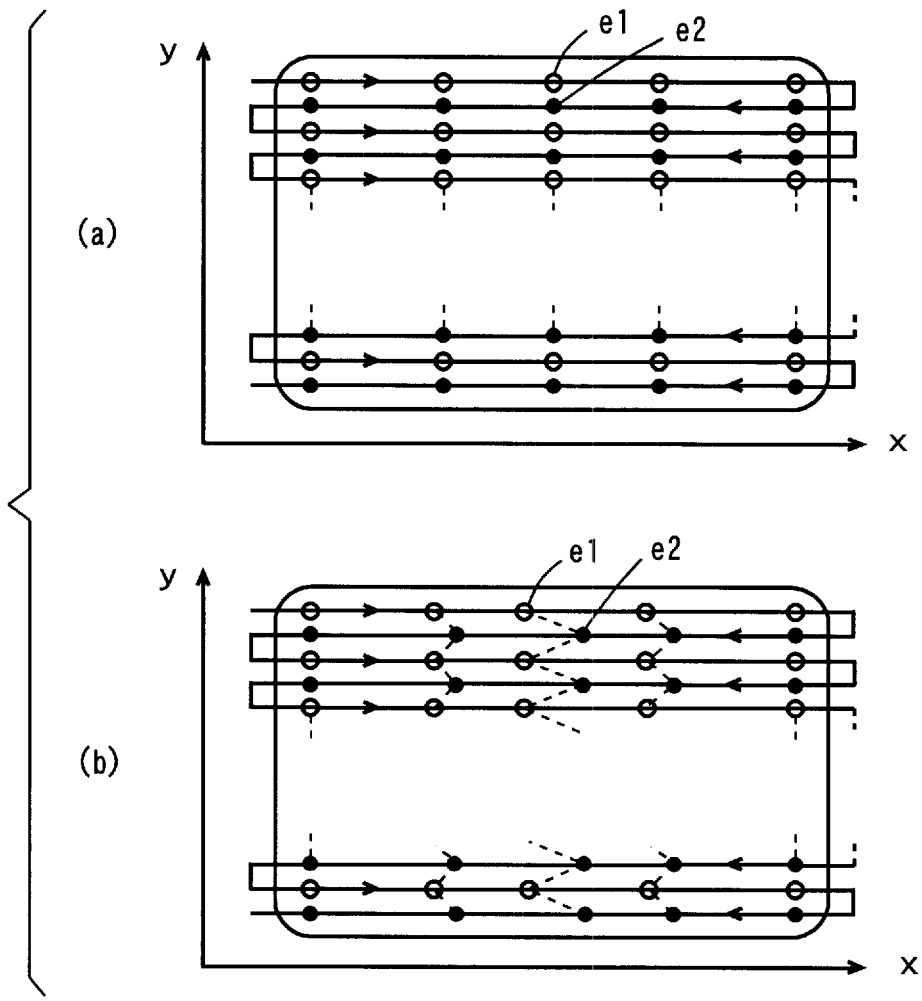
F I G. 1 3 PRIOR ART
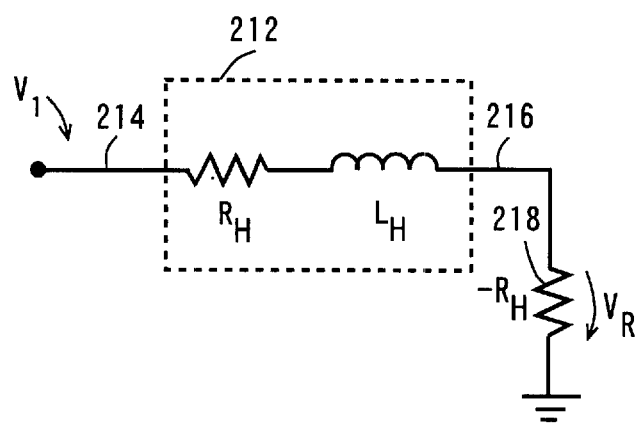

F I G. 1 4  PRIOR ART
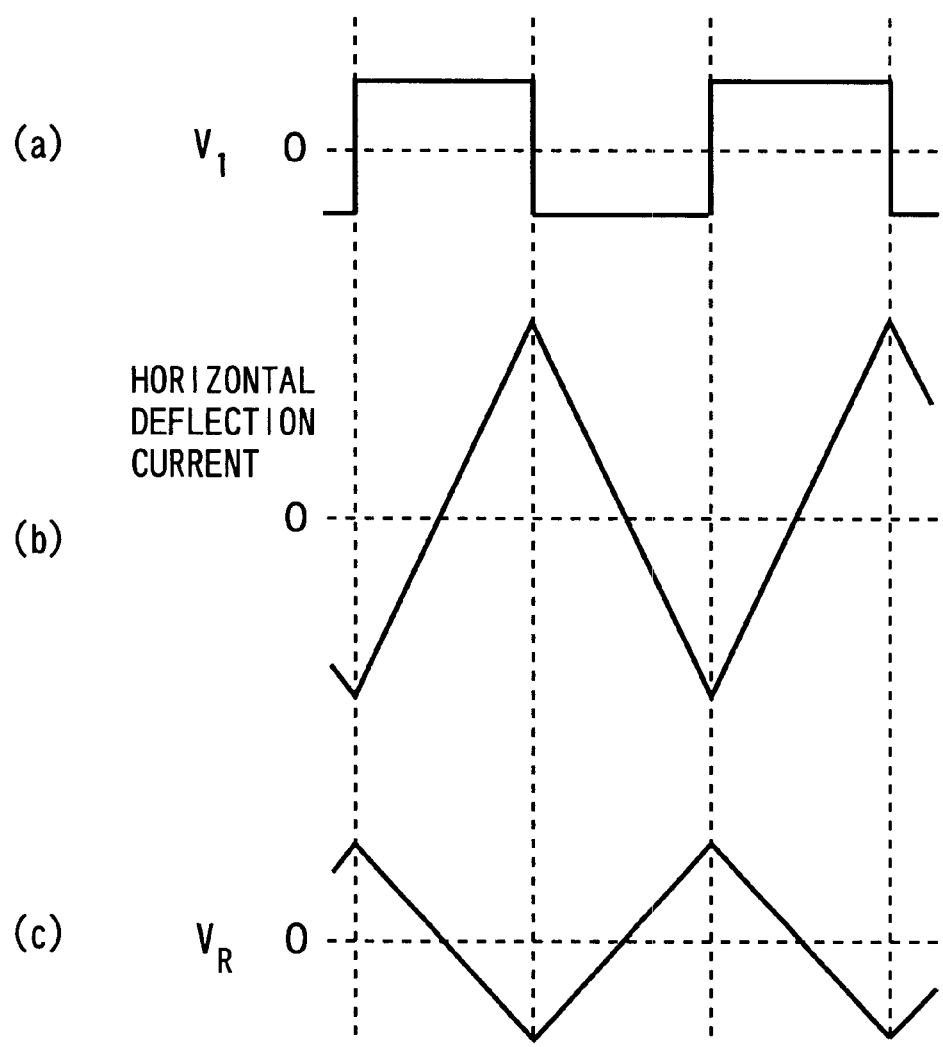

HORIZONTAL DEFLECTION CIRCUIT AND BIDIRECTIONAL HORIZONTAL DEFLECTION APPARATUS

BACKGROUND OF THE INVENTION

1. Field of the Invention

The present invention relates to a horizontal deflection circuit for performing bidirectional scanning with an electron beam in the horizontal direction of a display screen, and a bidirectional horizontal deflection apparatus including such a circuit.

2. Description of the Related Art

In the field of display devices such as a cathode ray tube (hereinafter simply as "CRT"), the use of a bidirectional horizontal deflection apparatus suitable for displaying high definition images has been suggested. The bidirectional horizontal deflection apparatus is used to perform bidirectional scanning with an electron beam using a horizontal deflection coil. In the bidirectional horizontal deflection apparatus, the horizontal deflection coil equivalently has an inductance component and a resistance component connected in series therewith, and therefore pixels which should be aligned vertically could be shifted in the horizontal direction between forward and retrace scanning.

FIGS. 11A and 11B are charts for use in illustration of change with time in the horizontal deflection current passed across the horizontal deflection coil. FIGS. 12A and 12B are views for use in illustration of the state of a display screen corresponding to the current waveform of the horizontal deflection current shown in FIGS. 11A and 11B. Note that in FIGS. 12A and 12B, the coordinate in the horizontal direction is referred to as "x-coordinate", and the coordinate in the vertical direction is referred to as "y-coordinate".

FIG. 11A shows an ideal current waveform for a horizontal deflection current. In the state in FIG. 11A, the length of a trace scanning period T1 with an electron beam coincides with the length of a retrace scanning period T2, and time points t1 and t2 where current is zero during the forward and retrace scanning correspond to the midpoints of the scanning periods T1 and T2, respectively. Therefore, as shown in FIG. 12A, pixels which should be aligned vertically are displayed on the same x-coordinate in froward and retrace scanning. In forward and retrace scanning, pixels e1 and e2 in the center of the horizontal direction of the screen in FIG. 12A for example are displayed at positions on the same x-coordinate.

FIG. 11B shows a current waveform having a distortion caused by the resistance component of the horizontal deflection coil. In the state shown in FIG. 11B, the lengths of the forward and retrace scanning periods T3 and T4 coincide, while the midpoints t4 and t6 of forward and retrace scanning periods T3 and T4 do not coincide with time points t3 and t5 where the horizontal deflection current is zero. As a result, as shown in FIG. 12B, pixels which should be aligned vertically are shifted in a zigzag manner in forward and retrace scanning, in other words "zigzag vertical line interference" is caused. In forward and retrace scanning, pixels e1 and e2 for example in the center in the horizontal direction of the screen in FIG. 12B are displayed at different x-coordinates.

FIG. 13 is an equivalent circuit diagram of a configuration to prevent the zigzag vertical line interference by reducing the distortion in the horizontal deflection current. The circuit is used for example in a bidirectional horizontal deflection system disclosed by Japanese Patent Laid-Open No. 7-203238. In FIG. 13, since a horizontal deflection coil 212 and a negative resistance 218 are connected in series with each other. The negative resistance 218 cancels the resistance component $R_H$ of the horizontal deflection coil 212.

FIG. 14 is a waveform chart showing the operation of the equivalent circuit in FIG. 13. As shown in FIG. 14 at (a), voltage $V_1$ applied to an input terminal 214 has a square waveform. Since the inductance $L_H$ of the horizontal deflection coil 212 is large, the horizontal deflection current passed across an output terminal 216 has a triangular waveform. The waveform of voltage $V_R$ generated with the negative resistance 218 is 90° out of phase from the triangular waveform shown in FIG. 14 at (b). The voltage generated with the resistance component $R_H$ is cancelled by the voltage $V_R$ generated with the negative resistance 218, so that the horizontal deflection current passed across the equivalent circuit in FIG. 13 appears to have no loss by the resistance and no distortion. However, if the distortion of the current passed across the horizontal deflection coil 212 by the resistance component $R_H$ is cancelled with the negative resistance 218, the power consumption increases.

In the horizontal deflection system, as means for preventing the zigzag vertical line interference with small power consumption, Japanese Patent Laid-Open No. 8-172543 discloses a reciprocating deflection type CRT display device. The CRT display device includes zigzag vertical line interference automatic cancellation means which modulates a reading clock signal used to read out data corresponding to each pixel, changes the amount of delay of a horizontal synchronizing signal used as a reference for the reading clock signal, and stabilizes the changing horizontal size to cancel the zigzag vertical line interference.

FIG. 15 is a waveform chart for use in illustration of the operation of the conventional zigzag vertical line interference automatic cancellation means. The voltage waveform 227 in FIG. 15 at (a) is the waveform of pulse voltage $V_P$ applied to pass horizontal deflection current across the horizontal deflection coil. The voltage waveform 226 is the waveform of a voltage pulse obtained by frequency-dividing the reading clock signal into ½. The current waveform 228 in FIG. 15 at (c) is the waveform of a horizontal scanning position signal in proportion to the waveform of the horizontal deflection current.

The zigzag vertical line interference automatic cancellation means compares the values $I(A_1)$ and $I(B_1)$, and values $I(A_2)$ and $I(B_2)$ of the horizontal scanning position signal having one-to-one correspondence with horizontal coordinates on a reproduced image at the starting point $A_1$ and the midpoint $A_2$ of the first trace scanning and at the ending point $B_1$ and the midpoint $B_2$ of retrace scanning following the trace scanning. The conventional zigzag vertical line interference automatic cancellation means detects the horizontal size based on the difference between the values $I(A_1)$ and $I(A_3)$ of the horizontal scanning position signal at the starting point $A_1$ and the ending point $A_3$ of the trace scanning.

FIG. 16 is a diagram showing the configuration of the conventional zigzag vertical line interference automatic cancellation means. The conventional zigzag vertical line interference automatic cancellation means shown in FIG. 16 includes horizontal deflection current detection means 303, decoder means 304 for sampling pulse generation, sample-hold means 305 to 309, subtractors 310 to 312, a comparison amplifier 313, variable delay means 314, a gain control circuit 315, and a power supply voltage control circuit 316.

The horizontal deflection current detection means 303 includes for example a resistor or/and a transformer, and is connected in series to a deflection coil 301 and an S distortion correction capacitor 302.

An input terminal 326 is provided with a signal produced by frequency-dividing the horizontal synchronizing signal into ½. The decoder means 304 for sampling pulse generation is provided with a signal indicating the timing of reading out a pixel from a counter 317 forming a reading phase locked loop for generating a reading clock signal. The decoder means 304 for sampling pulse generation decodes the signal indicating the timing and outputs sampling signals 318 to 322 to the sample-hold means 305 to 309 depending on the signal at the input terminal 326.

The sample-hold means 305 to 309 sample and hold a horizontal scanning position signal I output from the horizontal deflection current detection means 303 in the timings corresponding to the sampling signals 318 to 322, respectively applied from the decoder means 304 for sampling pulse generation which will be described. Thus, the sample-holdmeans 305 to 309 hold the values $I(A_1)$, $I(B_1)$, $I(A_2)$, $I(B_2)$, and $I(A_3)$ of the horizontal scanning position signal I sampled in the timings of reading the pixels at the starting point A in the trace scanning, the ending point B, in the retrace scanning, the midpoint $A_2$ in the trace scanning, the midpoint $B_2$ in the retrace scanning and the ending point $A_3$ in the trace scanning, respectively.

The subtracter 310 subtracts the value $I(B_1)$ of the horizontal scanning position signal held by the sample-hold means 306 from the value $I(A_1)$ of the horizontal scanning position signal held by the sample-hold means 305, and outputs the result to the variable delay means 314. The variable delay means 314 delays the horizontal synchronizing signal supplied to a phase locked loop circuit for generating a reading clock signal based on the output signal of the subtracter 310. Thus, the zigzag vertical line interference automatic cancellation means in FIG. 16 automatically cancels zigzag vertical line interference at the left end of a reproduced image.

The subtracter 311 subtracts the value $I(B_2)$ of the horizontal scanning position signal held by the sample-hold means 308 from the value $I(A_2)$ of the horizontal scanning position signal held by the sample-hold means 307, and outputs the result to the gain adjusting circuit 315. The gain adjusting circuit changes voltage to be applied to the voltage controlled oscillator in the phase locked loop circuit generating the reading clock signal. Thus, the gain adjusting circuit 315 changes the frequency of the reading clock signal. The zigzag vertical line interference automatic cancellation means in FIG. 16 thus automatically cancels zigzag vertical line interference in the center of a reproduced image.

The subtracter 312 subtracts the value $I(A_3)$ of the horizontal scanning position signal held by the sample-hold means 309 from the value $I(A_1)$ of the horizontal scanning position signal held by the sample-hold means 305, and applies the result to the non-inverting input terminal of the comparison amplifier 313. The comparison amplifier 313 amplifies the difference between the output signal of the subtracter 312 and a reference value $I_R$ applied to an input terminal 390 and applies the result to the power supply voltage control circuit 316. The power supply voltage control circuit 316 increase/reduces the power supply voltage applied to the horizontal deflection coil based on changes in the control input $(I(A_1)-I(A_3)-I_R)$ in order to keep constant the horizontal size.

As described above, in the bidirectional horizontal deflection system shown in FIG. 13, the use of the negative resistance 218 allows the zigzag vertical line interference to be prevented. The zigzag vertical line interference cancellation means as shown in FIG. 16 modulates the reading clock signal to cancel the zigzag vertical line interference.

However, the bidirectional horizontal deflection apparatus is typically provided with an EW correction circuit to correct east-west pincushion distortion (EW: right-left distortion). The EW correction circuit modulates horizontal deflection current using a parabolic waveform changing in a parabolic form at the vertical scanning interval. In this case, the horizontal deflection circuit supplying the horizontal deflection current to the horizontal deflection coil is affected by the parabolic waveform by the EW correction circuit supplying the horizontal deflection current to the horizontal deflection coil. The horizontal deflection circuit is affected by the vertical deflection current which is large current. As a result, a forward video signal and a backward video signal are shifted from one another at the top and bottom of the screen.

SUMMARY OF THE INVENTION

It is an object of the present invention to provide a horizontal deflection circuit capable of canceling zigzag vertical line interference in any positions of the top, center, and bottom of a screen and a bidirectional horizontal deflection apparatus including such a circuit.

A horizontal deflection circuit according to one aspect of the present invention performs bidirectional scanning with an electron beam in the horizontal direction of a screen for displaying an image and includes a horizontal deflection coil, a first current supply circuit for supplying the horizontal deflection coil with first horizontal deflection current for forward horizontal deflection, a second current supply circuit for supplying the horizontal deflection coil with second horizontal deflection current for backward horizontal deflection, a first driving circuit for driving the first current supply circuit so that voltage generated by the first horizontal deflection current is in synchronization with a first timing signal indicating a trace scanning period, a second driving circuit for driving the second current supply circuit so that voltage generated by the second horizontal deflection current is in synchronization with a second timing signal indicating a retrace scanning period, a deflection current correction circuit for correcting the first horizontal deflection current and the second horizontal deflection current based on a first correction waveform periodically changing at a vertical scanning intervals, and a driving timing correction circuit for correcting the driving timing of the first current supply circuit by the first driving circuit and the driving timing of the second current supply circuit by the second driving circuit based on a second correction waveform periodically changing at the vertical scanning intervals corresponding to the first correction waveform so that the horizontal positions of corresponding portions of forward and backward video signals coincide in each position in the vertical direction of the screen.

In the horizontal deflection circuit according to the present invention, the first horizontal deflection coil is supplied with the first horizontal deflection current for forward horizontal deflection by the first current supply circuit and the second horizontal deflection current for backward horizontal deflection by the second current supply circuit. In this case, the first current supply circuit is driven by the first driving circuit so that voltage generated by the first horizontal deflection current is in synchronization with a first timing signal indicating a trace scanning period, and the second current supply circuit is driven by the second driving circuit so that voltage generated by the second horizontal deflection current is in synchronization with a second timing signal indicating a retrace scanning period. The first horizontal deflection current and second horizontal deflection current are corrected by the deflection current correction circuit based on a first correction waveform periodically changing at vertical scanning intervals. Thus, the deflection distortion of an image displayed on the screen based on a video signal can be corrected.

Furthermore, the driving timings of the first and second current supply circuits by the first and second driving circuits are corrected by the driving timing correction circuit based on a second correction waveform periodically changing at the vertical scanning intervals corresponding to the first correction waveform. Thus, the horizontal positions of corresponding portions of forward and backward video signals coincide in each position in the vertical direction of the screen.

Thus, the starting timing of forward and retrace scanning can always be kept constant at the top, center, and bottom of the screen. Therefore, zigzag vertical line interference can be cancelled in any positions of the top, center, and bottom of the screen.

The driving timing correction circuit may control horizontal deflection amplitudes by the first and second driving circuits at the vertical scanning intervals based on the second correction waveform.

In this case, the horizontal deflection amplitude is controlled at the vertical scanning intervals based on the second correction waveform, and therefore the starting timing of forward and retrace scanning can always be kept constant at the top, center, and bottom of the screen.

The driving timing correction circuit may control the amplitude of the second correction waveform based on a first amplitude control signal.

In this case, the amplitude of the second correction waveform is controlled based on the first amplitude control signal, and therefore the starting timing of forward and retrace scanning can always be kept constant at the top, center, and bottom of the screen.

The deflection current correction circuit may include an east-west pincushion distortion correction circuit for correcting east-west pincushion distortion.

In this case, east-west pincushion distortion in an image displayed on the screen is corrected by the east-west pincushion distortion correction circuit. A shift in the driving timing of the first and second current supply circuits by the effect of the first correction waveform is corrected based on the second correction waveform at the vertical scanning intervals. As a result, while the east-west pincushion distortion is corrected, zigzag vertical line interference can be cancelled in any positions of the top, center, and bottom of the screen.

The first and second correction waveforms may periodically change in a parabolic form at the vertical scanning intervals.

In this case, east-west pincushion distortion in an image displayed on the screen is corrected by the distortion current correction circuit based on the first correction waveform periodically changing in a parabolic form at the vertical scanning intervals. A shift in the driving timing of the first and second current supply circuits by the effect of the first correction waveform periodically changing in a parabolic form is corrected based on the second correction waveform periodically changing in a parabolic form at the vertical scanning intervals. Therefore, zigzag vertical line interference can be cancelled in any positions of the top, center, and bottom of the screen.

The first driving circuit may include a first phase comparator for outputting voltage based on the phase difference between the first timing signal and voltage generated by the first horizontal deflection current, a first low-pass filter for integrating the voltage output from the first phase comparator, a first adder for adding the output voltage of the first low-pass filter and the output voltage of the driving timing correction circuit and outputting the result, and a first control circuit responsive to a first trigger signal and the output signal of the first adder for turning on and off the first current supply circuit, and the second driving circuit may include a second phase comparator for outputting voltage based on the phase difference between the second timing signal and voltage generated by the second horizontal deflection current, a second low-pass filter for integrating the voltage output from the second phase comparator, a second adder for adding the output voltage of the second low-pass filter and the output voltage of the driving timing correction circuit and outputting the result, and a second control circuit responsive to a second trigger signal and the output signal of the second adder for turning on and off the second current supply circuit.

In this case, the first phase comparator, the first low-pass filter, the first adder, and the first control circuit drive the first current supply circuit in synchronization with the first timing signal. The second phase comparator, the second low-pass filter, the second adder and the second control circuit drive the second current supply circuit in synchronization with the second timing signal. Furthermore, the output voltage of the first low-pass filter and the output voltage of the driving timing correction circuit are added by the first adder, the output voltage of the second low-pass filter and the output voltage of the driving timing correction circuit are added by the second adder. Thus, the horizontal positions of corresponding portions of forward and backward video signals coincide in each position in the vertical direction of the screen.

The driving timing correction circuit may correct the driving timing of the first current supply circuit by the first driving circuit and the driving timing of the second current supply circuit by the second driving circuit based on a third correction waveform periodically changing at the vertical scanning intervals based on the second correction waveform and corresponding to the waveform of an interference signal so that the horizontal positions of corresponding portions of forward and backward video signals coincide in each position in the vertical direction of the screen.

In this case, the driving timings of the first and second current supply circuits by the first and second driving circuits are corrected by the driving timing correction circuit based on a third correction waveform periodically changing at the vertical scanning intervals corresponding to the waveform of an interference signal in addition to the second correction waveform. Thus, if an interference signal is received, the horizontal positions of corresponding portions of forward and backward video signals coincide in each position in the vertical direction of the screen. As a result, while the effect of the interference signal can be eliminated, zigzag vertical line interference can be cancelled in any positions of the top, center, and bottom of the screen.

The driving timing correction circuit may control horizontal deflection amplitudes by the first and second driving circuits at the vertical scanning intervals based on the waveform of the interference signal.

In this case, the horizontal deflection amplitude is controlled at the vertical scanning intervals based on the waveform of the interference signal, and therefore the starting timing of forward and retrace scanning can always be kept constant at the top, center, and bottom of the screen.

The driving timing correction circuit may control the amplitude of the third correction waveform based on a second amplitude control signal. The interference signal may be derived from vertical deflection current.

In this case, the amplitude of the third correction waveform is controlled based on the second amplitude control signal, and therefore the starting timing of forward and retrace scanning can always be kept constant at the top, center, and bottom of the screen.

The waveform of the interference signal and the third correction waveform may periodically change in a saw-tooth waveform at the vertical scanning intervals. The interference signal may be derived from the vertical deflection current.

When an interference signal changing in a saw-tooth waveform such as vertical deflection current is received at the vertical scanning intervals, a shift in the driving timings of the first and second current supply circuits by the effect of the interference signal is corrected based on the third correction waveform periodically changing in a saw-tooth waveform at the vertical scanning intervals. As a result, when such an interference signal changing in a saw-tooth waveform is received, zigzag vertical line interference can be cancelled in any positions of the top, center, and bottom of the screen.

A horizontal deflection circuit according to another aspect of the present invention performs bidirectional scanning with an electron beam in the horizontal direction of a screen to display an image and includes a horizontal deflection coil, a first current supply circuit for supplying the horizontal deflection coil with first horizontal deflection current for forward horizontal deflection, a second current supply circuit for supplying the horizontal deflection coil with second horizontal deflection current for backward horizontal deflection, a first driving circuit for driving the first current supply circuit so that voltage generated by the first horizontal deflection current is in synchronization with a first timing signal indicating a trace scanning period, a second driving circuit for driving the second current supply circuit so that voltage generated by the second horizontal deflection current is in synchronization with a second timing signal indicating a retrace scanning period, and a driving timing correction circuit for correcting the driving timing of the first current supply circuit by the first driving circuit and the driving timing of the second current supply circuit by the second driving circuit based on a correction waveform periodically changing at vertical scanning intervals corresponding to the waveform of an interference signal so that the horizontal positions of corresponding portions of forward and backward video signals coincide in each position in the vertical direction of the screen.

In the horizontal deflection circuit according to the present invention, the horizontal deflection coil is provided with the first horizontal deflection current for forward horizontal deflection by the first current supply circuit and the second horizontal deflection current for backward horizontal deflection by the second current supply circuit. In this case, the first current supply circuit is driven by the first driving circuit so that voltage generated by the first horizontal deflection current is in synchronization with the first timing signal, and the second current supply circuit is driven by the second driving circuit so that voltage generated by the second horizontal deflection current is in synchronization with the second timing signal indicating a retrace scanning period.

When an interference signal is received, the driving timings of the first and second current supply circuits by the first and second driving circuits are corrected based on a correction waveform periodically changing at the vertical scanning intervals corresponding to the waveform of the interference signal. Thus, the horizontal positions of corresponding portions of forward and backward video signals coincide in each position in the vertical direction of the screen.

In this manner, the starting timing of forward and retrace scanning can always be kept constant at the top, center, and bottom of the screen. As a result, zigzag vertical line interference can be cancelled in any positions of the top, center, and bottom of the screen.

The driving timing correction circuit may control horizontal deflection amplitudes by the first and second driving circuits at the vertical scanning intervals based on the waveform of the interference signal.

In this case, the horizontal deflection amplitude is controlled at the vertical scanning intervals based on the waveform of the interference signal, and therefore the starting timing of forward and retrace scanning can always be kept constant at the top, center, and bottom of the screen.

The driving timing correction circuit may change the amplitude of the correction waveform based on an amplitude control signal.

In this case, the amplitude of the correction waveform is controlled based on the amplitude control signal, and therefore the starting timing of forward and retrace scanning can always be kept constant at the top, center, and bottom of the screen.

The waveform of the interference signal and the correction waveform may periodically change in a saw-tooth waveform at the vertical scanning intervals.

If an interference signal changing in a saw-tooth waveform such as vertical deflection current is received at the vertical scanning intervals, a shift in the driving timings of the first and second current supply circuits by the effect of the interference signal is corrected based on the correction waveform periodically changing in a saw-tooth waveform at the vertical scanning intervals. If therefore such an interference signal changing in a saw-tooth waveform is received, zigzag vertical line interference can be cancelled in any positions of the top, center, and bottom of the screen.

The first driving circuit may include a first phase comparator for outputting voltage based on the phase difference between the first timing signal and voltage generated by the first horizontal deflection current, a first low-pass filter for integrating the voltage output from the first phase comparator, a first adder for adding the output voltage of the first low-pass filter and the output voltage of the driving timing correction circuit and outputting the result, and a first control circuit responsive to a first trigger signal and the output signal of the first adder for turning on and off the first current supply circuit, and the second driving circuit may include a second phase comparator for outputting voltage based on the phase difference between the second timing signal and voltage generated by the second horizontal deflection current, a second low-pass filter for integrating the voltage output from the second phase comparator, a second adder for adding the output voltage of the second low-pass filter and the output voltage of the driving timing correction circuit, and a second control circuit responsive to a second trigger signal and the output signal of the second adder for turning on and off the second current supply circuit.

In this case, the first phase comparator, the first low-pass filter, the first adder, and the first control circuit drive the first current supply circuit in synchronization with the first timing signal. The second phase comparator, the second low-pass filter, the second adder, and the second control circuit drive the second current supply circuit in synchronization with the second timing signal. Furthermore, the first adder adds the output voltage of the first low-pass filter and the output voltage of the driving timing correction circuit, and the second adder adds the output voltage of the second low-pass filter and the output voltage of the driving timing correction circuit. Thus, the driving timings of the first and second current supply circuits are corrected so that the horizontal positions of corresponding portions of forward and backward video signals coincide in each position in the vertical direction of the screen.

A bidirectional horizontal deflection apparatus according to yet another aspect of the present invention performs bidirectional scanning with an electron beam in the horizontal direction of a screen and includes a storing circuit for storing image information, a first clock generation circuit for generating a first clock signal to write image information corresponding to forward and retrace scanning to the storing circuit, a second clock generation circuit for generating a second clock signal to read out image information corresponding to forward and retrace scanning from the storing circuit, a horizontal deflection circuit for deflecting an electron beam based on image information read out from the storing circuit forward and backward in the horizontal direction and forming a scanning line on the screen, a detection circuit for detecting the timing of an electron beam being at a prescribed position substantially in the center in the horizontal direction of the screen and outputting a detection signal based on the result, and a phase control circuit controlling the phase of the first or second clock signal generated by the first or second clock generation circuit so that a prescribed number of image information pieces are displayed from one end to the other end of each scanning line in forward and retrace scanning and image information corresponding to the prescribed position is displayed in synchronization with the detection signal generated by the detection circuit, and the horizontal deflection circuit includes a horizontal deflection coil, a first current supply circuit for supplying the horizontal deflection coil with first horizontal deflection current for forward horizontal deflection, a second current supply circuit for supplying the horizontal deflection coil with second horizontal deflection current for backward horizontal deflection, a first driving circuit for driving the first current supply circuit so that voltage generated by the first horizontal deflection current is in synchronization with a first timing signal indicating a trace scanning period, a second driving circuit for driving the second current supply circuit so that voltage generated by the second horizontal deflection current is in synchronization with a second timing signal indicating a retrace scanning period, a deflection current correction circuit for correcting the first horizontal deflection current and the second horizontal deflection current based on a first correction waveform periodically changing at vertical scanning intervals, and a driving timing correction circuit for correcting the driving timing of the first current supply circuit by the first driving circuit and the driving timing of the second current supply circuit by the second driving circuit based on a second correction waveform periodically changing at the vertical scanning intervals corresponding to the first correction waveform so that the horizontal positions of corresponding portions of forward and backward video signals coincide in each position in the vertical direction of the screen.

In the bidirectional horizontal deflection apparatus according to the present invention, image information is written in the storing circuit in response to the first clock signal generated by the first clock generation circuit, and image information is read out from the storing circuit in response to the second clock signal generated by the second clock generation circuit. An electron beam based on image information read out from the storing circuit is deflected forward and backward in the horizontal direction by the horizontal deflection circuit and a scanning line is formed on the screen. The timing of the electron beam being at a prescribed position substantially in the center in the horizontal direction of the screen is detected by the detection circuit, and a detection signal indicating the timing is generated. The phase of the first or second clock signal generated by the first or second clock generation circuit is controlled by the phase control circuit, and therefore a prescribed number of image information pieces are displayed from one end to the other end of each scanning line in forward and retrace scanning, and image information corresponding to the prescribed position is displayed in synchronization with the detection signal generated by the detection circuit.

Thus, the timing of the electron beam being at the prescribed position substantially in the center in the horizontal direction of the screen coincides with the timing of image information corresponding to the prescribed position being displayed, so that zigzag vertical line interference can be prevented substantially in the center in the horizontal direction of the screen. The zigzag vertical line interference can be prevented by providing the detection circuit for detecting the timing of the electron beam being at a prescribed position substantially in the center in the horizontal direction of the screen and the phase control circuit controlling the phase of the first or second clock signal, in other words, the interference can be prevented in a simple manner.

Since the horizontal deflection circuit is provided, the starting timing of forward and retrace scanning can always be kept constant at the top, center, and bottom of the screen. As a result, zigzag vertical line interference can be cancelled in any positions of the top, center, and bottom of the screen.

The deflection current correction circuit may include an east-west pincushion distortion correction circuit for correcting east-west pincushion distortion.

In this case, the east-west pincushion distortion correction circuit corrects east-west pincushion distortion in an image displayed on the screen. A shift in the driving timings of the first and second current supply circuits by the effect of the first correction waveform is corrected based on the second correction waveform at the vertical scanning intervals. As a result, while east-west pincushion distortion is corrected, zigzag vertical line interference can be cancelled in any positions of the top, center, and bottom of the screen.

A bidirectional horizontal deflection apparatus according to a still further aspect of the present invention performs bidirectional scanning with an electron beam in the horizontal direction of a screen and includes a storing circuit for storing image information, a first clock generation circuit for generating a first clock signal to write image information corresponding to forward and retrace scanning to the storing circuit, a second clock generation circuit for generating a second clock signal to read out image information corresponding to forward and retrace scanning from the storing circuit, a horizontal deflection circuit for deflecting an electron beam based on image information read out from the storing circuit forward and backward in the horizontal direction and forming a scanning line on the screen, a detection circuit for detecting the timing of an electron beam being at a prescribed position substantially in the center in the horizontal direction of the screen and generating a detection signal based on the result, and a phase control circuit for controlling the phase of the first or second clock signal generated by the first or second clock generation circuit so that a prescribed number of image information pieces are displayed from one end to the other end of each scanning line in forward and retrace scanning, and image information corresponding to the prescribed position is displayed in synchronization with the detection signal generated by the detection circuit, the horizontal deflection circuit includes a horizontal deflection coil, a first current supply circuit for supplying the horizontal deflection coil with first horizontal deflection current for forward horizontal deflection, a second current supply circuit for supplying the horizontal deflection coil with second horizontal deflection current for backward horizontal deflection, a first driving circuit for driving the first current supply circuit so that voltage generated by the first horizontal deflection current is in synchronization with a first timing signal indicating a trace scanning period, a second driving circuit for driving the second current supply circuit so that voltage generated by the second horizontal deflection current is in synchronization with a second timing signal indicating a retrace scanning period, and a driving timing correction circuit for correcting the driving timing of the first current supply circuit by the first driving circuit and the driving timing of the second current supply circuit by the second driving circuit based on a correction waveform periodically changing at vertical scanning intervals corresponding to the waveform of an interference signal so that the horizontal positions of corresponding portions of forward and backward video signals coincide in each position in the vertical direction of the screen.

In the bidirectional horizontal deflection apparatus according to the present invention, image information is written into the storing circuit in response to the first clock signal generated by the first clock generation circuit, and image information is read out from the storing circuit in response to the second clock signal generated by the second clock generation circuit. An electron beam based on image information read out from the storing circuit is deflected forward and backward in the horizontal direction by the horizontal deflection circuit and a scanning line is formed on the screen. The timing of the electron beam being at a prescribed position substantially in the center in the horizontal direction of the screen is detected by the detection circuit, and a detection signal indicating the timing is generated. The phase of the first or second clock signal generated by the first or second clock generation circuit is controlled by the phase control circuit, and therefore a prescribed number of image information pieces are displayed from one end to the other end of each scanning line in forward and retrace scanning, and image information corresponding to the prescribed position is displayed in synchronization with the detection signal generated by the detection circuit.

Thus, the timing of the electron beam being at the prescribed position substantially in the center of the screen coincides with the timing of image information corresponding to the prescribed position being displayed, and therefore zigzag vertical line interference can be prevented substantially in the center in the horizontal direction of the screen. The zigzag vertical line interference can be prevented by providing the detection circuit for detecting the timing of the electron beam being at the prescribed position substantially in the center in the horizontal direction of the screen and the phase control circuit for controlling the phase of the first or second clock signal, in other words, the interference can be prevented in a simple manner.

The horizontal deflection circuit is provided and therefore the starting timing of forward and retrace scanning can always be kept constant at the top, center, and bottom of the screen. As a result, the zigzag vertical line interference can be cancelled in any positions of the top, center, and bottom of the screen.

The waveform of the interference signal and the correction waveform may periodically change in a saw-tooth waveform at the vertical scanning intervals. The interference signal may be derived from vertical deflection current.

If an interference signal periodically changing in a saw-tooth waveform at the vertical scanning intervals such as vertical deflection current is received, a shift in the driving timings of the first and second current supply circuits by the effect of the interference signal is corrected based on the correction waveform periodically changing in a saw-tooth waveform at the vertical scanning intervals. As a result, if an interference signal changing in a saw-tooth waveform is received, zigzag vertical line interference can be cancelled in any positions at the top, center, and bottom of the screen.

The forgoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing one configuration of a bidirectional horizontal deflection apparatus according to a first embodiment of the present invention;

FIG. 10 is a circuit diagram showing the configuration of a horizontal deflection circuit in a bidirectional horizontal deflection apparatus according to a third embodiment of the present invention;

FIGS. 11A and 11B are charts for use in illustration of change with time in horizontal deflection current passed across a horizontal deflection coil;

FIGS. 12A and 12B are charts for use in illustration of the states of a display screen corresponding to the current waveforms of the horizontal deflection current in FIGS. 11A and 11B;

FIG. 13 is a circuit diagram showing an equivalent circuit for reducing an error generated in horizontal deflection current in a conventional bidirectional horizontal deflection system;

FIG. 14 is a waveform chart showing the operation of the equivalent circuit in FIG. 13;

Figure 2:
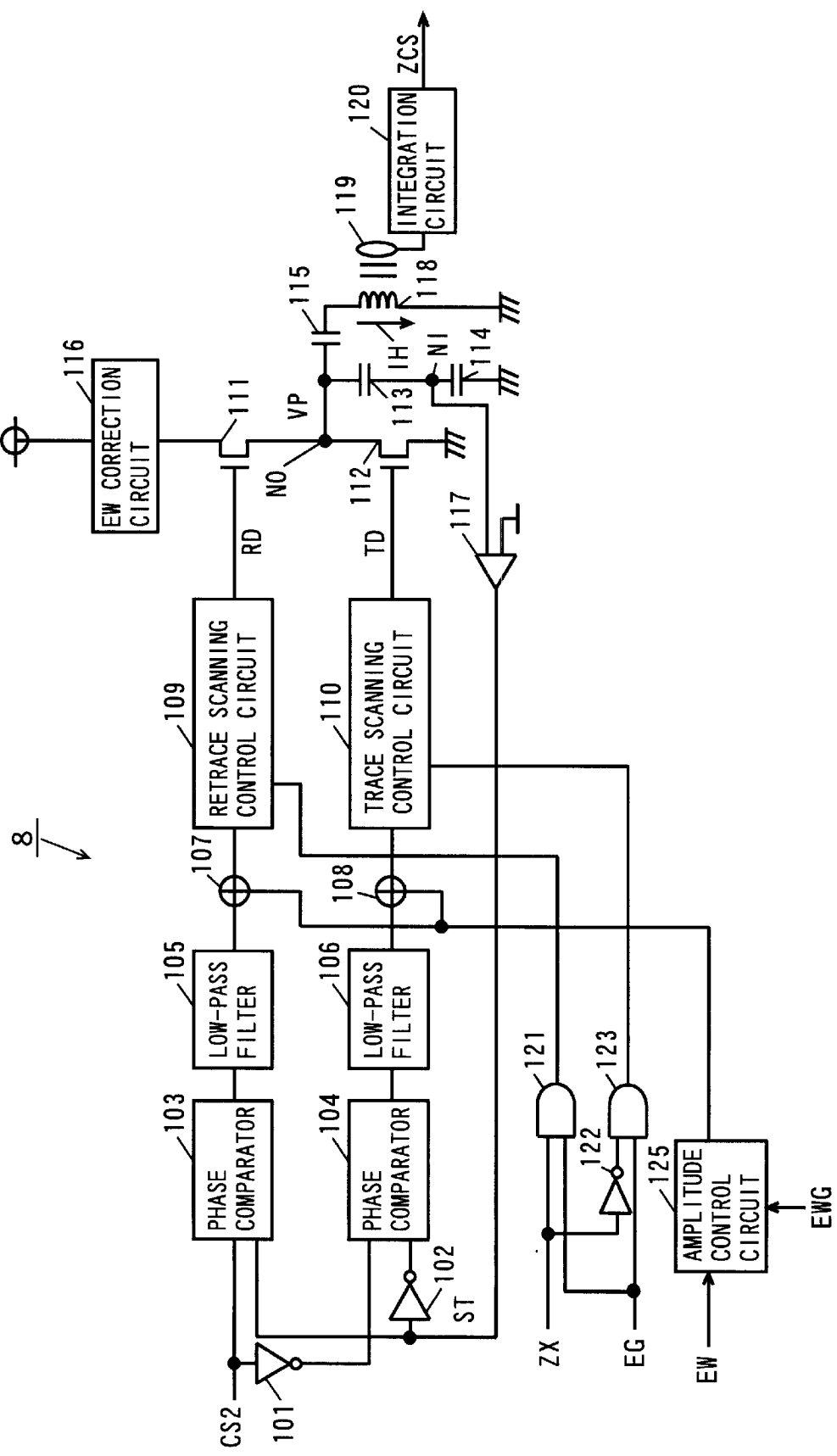
FIG. 2 is a circuit diagram showing the configuration of a horizontal deflection circuit in the bidirectional horizontal deflection apparatus in FIG. 1.

DESCRIPTION OF THE PREFERRED EMBODIMENTS (First Embodiment)

FIG. 1 is a block diagram showing one configuration of a bidirectional horizontal deflection apparatus according to a first embodiment of the present invention.

The bidirectional horizontal deflection apparatus in FIG. 1 includes input terminals 1 and 5, a video memory 2, a D/A converter 3, a writing phase locked loop circuit (hereinafter simply as "writing PLL circuit") 6, a reading phase locked loop circuit (hereinafter simply as "reading PLL circuit") 7, a horizontal deflection circuit 8, and a clock modulation circuit 9.

The video memory 2 is written with image data VD1 input from the input terminal 1 in response to a writing clock signal WCK applied from the writing PLL circuit 6 which will be described and a first switching signal CS1 indicating the timing of switching between forward and retrace scanning. The image data VD1 stored in the video memory 2 is read out in response to a reading clock signal RCK applied from the reading PLL circuit 7 which will be described and a second switching signal CS2 indicating the timing of switching between forward and retrace scanning, and the read data is output as image data VD2 to the D/A converter 3.

The video memory 2 inverts the relation between the order of image data writing and the order of image data reading for each horizontal scanning period (1H). More specifically, during a horizontal scanning period, the image data VD1 is read out from the video memory 2 in the same order as the order in which the image data VD1 has been written, and during the following horizontal scanning period, the image data VD1 is read out from the video memory 2 in the order reversed from the order in which the image data VD1 has been written.

The D/A converter 3 converts the image data VD2 into an analog video signal VS for output to a CRT 4. An image based on the video signal VS from the D/A converter 3 is displayed at the CRT 4 in synchronization with a horizontal synchronizing signal HS2 applied to the reading PLL circuit 7 which will be described below.

The writing PLL circuit 6 generates the writing clock signal WCK and the first switching signal CS1 and outputs these signals to the video memory 2 in response to the horizontal synchronizing signal HS1 input from an input terminal 5. The writing PLL circuit 6 generates the horizontal synchronizing signal HS2 from the horizontal synchronizing signal HS1 and outputs the signal to the reading PLL circuit 7.

The reading PLL circuit 7 generates the reading clock signal RCK in response to the horizontal synchronizing signal HS2 applied from the writing PLL circuit 6, modulates the reading clock signal RCK with a clock modulation signal CKM applied from the clock modulation circuit 9 and outputs the modulated signal to the video memory 2. The reading PLL circuit 7 applies a second switching signal CS2 to the video memory 2 and the horizontal deflection circuit 8, and applies a central pixel reading timing signal CPR ¼ cycle out of phase from the second switching signal CS2 to the clock modulation circuit 9. The reading PLL circuit 7 also applies a video center signal ZX and an on timing signal EG which will be described to the horizontal deflection circuit 8. Note that the configuration of the reading PLL circuit 7 will be later described.

The horizontal deflection circuit 8 generates a magnetic field to deflect an electron beam forward and backward in the horizontal direction in response to the second switching signal CS2, the video center signal ZX and the on timing signal EG. The horizontal deflection circuit 8 detects the time point where the horizontal deflection current to deflect the electron beam in the horizontal direction is zero and outputs a zero crossing signal ZCS indicating that the horizontal deflection current is zero to the clock modulation circuit 9. Note that the configuration of the horizontal deflection circuit 8 will be later described.

The clock modulation circuit 9 compares the central pixel reading timing signal CPR output by the reading PLL circuit 7 and the zero crossing signal ZCS output by the horizontal deflection circuit 8, generates the clock modulation signal CKM based on the phase difference and outputs the clock modulation signal CKM to the reading PLL circuit 7. Note that the configuration of the clock modulation circuit 9 will be later described.

FIG. 2 is a circuit diagram showing the configuration of the horizontal deflection circuit 8 in the bidirectional horizontal deflection apparatus in FIG. 1.

The horizontal deflection circuit 8 includes inverting elements 101 and 102, phase comparators 103 and 104, low-pass filters (LPFs) 105 and 106, adders 107 and 108, a retrace scanning control circuit 109, a trace scanning control circuit 110, and horizontal output field effect transistors (hereinafter simply as "horizontal output FETS") 111 and 112.

The horizontal deflection circuit 8 further includes capacitors 113 and 114, an S correction capacitor 115, an east-west pincushion distortion correction circuit (hereinafter simply as "EW correction circuit") 116, a comparator 117, a horizontal deflection yoke 118, a magnetic field detection coil 119, and an integrating circuit 120. The horizontal deflection circuit 8 further includes AND circuits 121 and 123, an inverting element 122, and an amplitude control circuit 125.

The phase comparator 103 compares the phase of the second switching signal CS2 output from the reading PLL circuit 7 and the phase of a horizontal automatic frequency control pulse (hereinafter simply as "horizontal AFC pulse") ST output from the comparator 117 which will be described and outputs an output signal in a level corresponding to the phase difference to the low-pass filter 105. The low-pass filter 105 removes the output signal from the phase comparator 103 of a frequency component higher than a prescribed frequency and outputs the resulting signal to one input terminal of the adder 7. The second switching signal CS2 takes "1" (high level) during trace scanning and "0" (low level) during retrace scanning in synchronization with the horizontal synchronizing signal HS2.

The inverting element 101 inverts the second switching signal CS2 output from the reading PLL circuit 7 and outputs the resulting signal. The inverting element 102 inverts the horizontal AFC pulse output from the comparator 117 and outputs the resulting signal. The phase comparator 104 compares the phase of the output signal of the inverting element 101 and the phase of the output signal of the inverting element 102, and outputs an output signal in a level corresponding to the phase difference to the low-pass filter 106. The low-pass filter 106 removes the output signal from the phase comparator 104 of a frequency component higher than a prescribed frequency and outputs the resulting signal to one input terminal of the adder 108.

The adder 107 adds the output signal of the low-pass filter 105 and the output signal of an amplitude control circuit 125 which will be described, and applies an output signal indicating the result of addition to the retrace scanning control circuit 109. The adder 108 adds the output signal of the low-pass filter 106 and the output signal of the amplitude control circuit 125, and applies an output signal indicating the result of addition to the trace scanning control circuit 110.

The retrace scanning control circuit 109 applies a gate pulse RD to the horizontal output FET 111. In this case, the retrace scanning control circuit 109 controls the falling timing of the gate pulse RD in response to the output signal of the adder 107 and the rising timing of the gate pulse RD in response to the output signal of the AND circuit 121.

The trace scanning control circuit 110 applies the gate pulse PD to the horizontal output FET 112. The trace scanning control circuit 110 controls the falling timing of the gate pulse TD in response to the output signal of the adder 108, and the falling timing of the gate pulse TD in response to the output signal of the AND circuit 123.

The EW correction circuit 116 and the horizontal output FET 111 are connected in series between a power supply terminal receiving power supply voltage and an output node NO. The horizontal output FET 112 is connected between the output node NO and the ground terminal. The capacitors 113 and 114 are connected in series between the output node NO and the ground terminal. The S correction capacitor 115 and the horizontal deflection yoke 118 are connected in series between the output node NO and the ground terminal.

The horizontal output FETs 111 and 112 turn on and off in response to the gate pulses RD and TD, so that horizontal deflection current IH is supplied to the horizontal deflection yoke 118 through the S correction capacitor 115.

At the time, the EW correction circuit 116 modulates the amplitude of the horizontal deflection current in a parabolic waveform at the vertical scanning intervals. Thus, the deflection distortion on the tube surface of the CRT 4 in FIG. 1 is compensated. The output signal of the magnetic field detection coil 119 is applied to the integrating circuit 120. The integrating circuit 120 applies output voltage in proportion to a magnetic field generated by the horizontal deflection yoke 118 to the clock modulation circuit 9 as the zero crossing signal ZCS.

The voltage at the output node NO is divided by the capacitors 113 and 114, and the voltage at a node N1 between the capacitors 113 and 114 is applied to one input terminal of the comparator 117. The other input terminal of the comparator 117 is provided with prescribed voltage. The comparator 117 compares the voltage at the node N1 and the prescribed voltage, and applies an output signal indicating the result of comparison to the phase comparator 103 and the inverting element 102 as the horizontal AFC pulse ST (see FIG. 6 at (l)).

In this case, a phase error is generated in the horizontal AFC pulse ST by the effect of the EW correction circuit 116. The phase error is corrected by a correction signal EW which will be described.

Thus, the off timing of the horizontal output FETs 111 and 112 is controlled, so that the starting points in forward and retrace scanning can be highly precisely matched to the second switching signal CS2. As a result, as shown in FIG. 6 at (l) which will be described, an output pulse VP having a duty ratio of exactly 50% may be provided at the output node NO.

Meanwhile, the video center signal ZX is applied to one input terminal of the AND circuit 121 and to one input terminal of the AND circuit 123 through the inverting element 122. The on timing signal EG indicating the on timing of the horizontal FETs 111 and 112 is applied to the other input terminals of the AND circuit 121 and the AND circuit 123. The output signal of the AND circuit 121 is applied to the retrace scanning control circuit 109. The output signal of the AND circuit 123 is applied to the trace scanning control circuit 110.

Figure 6:
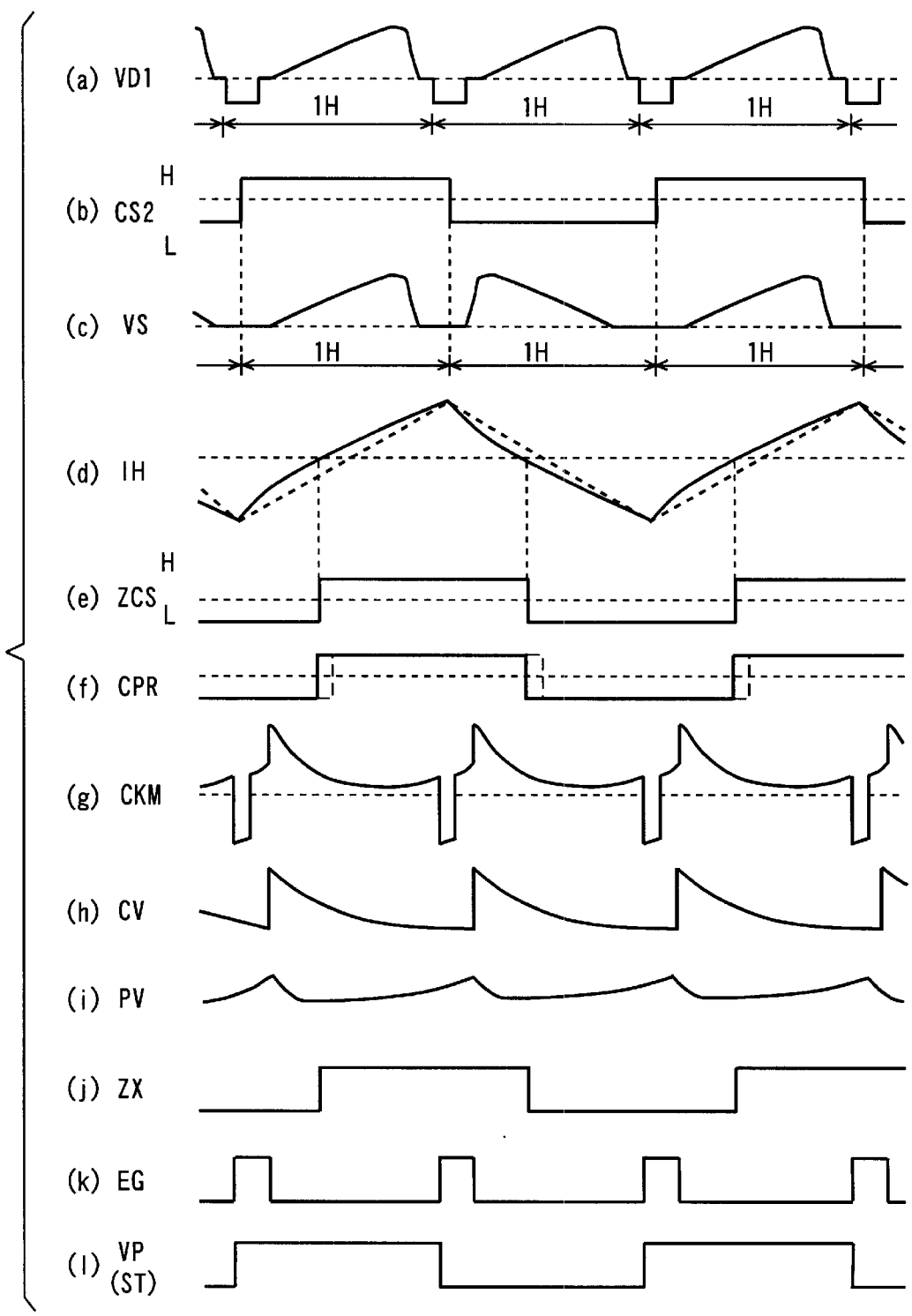
FIG. 6 is a waveform chart showing signals at parts of the bidirectional horizontal deflection apparatus in FIG. 1.

The video center signal ZX indicates the center of a video signal in one horizontal scanning period as shown in FIG. 6 at (j) which will be described. The on timing signal EG is in synchronization with the rising and falling of the second switching signal CS2 as shown in FIG. 6 at (k) which will be described.

The amplitude control circuit 125 is provided with the correction signal EW periodically changing in a parabolic form at the vertical scanning intervals and an amplitude control signal EWG. The amplitude control circuit 125 controls the amplitude of the correction signal EW in response to the amplitude control signal EWG, and applies an amplitude controlled output signal to the other input terminals of the adders 107 and 108.

Figure 3:
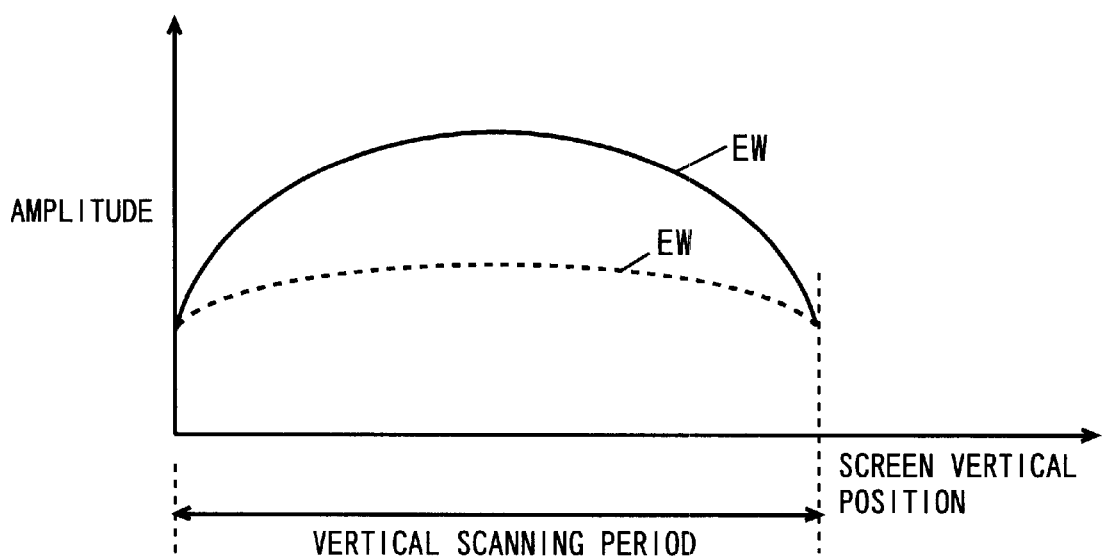
FIG. 3 is a waveform chart showing a correction signal applied to the amplitude control circuit in FIG. 2.

FIG. 3 is a waveform chart showing a correction signal applied to the amplitude control circuit 125. As shown in FIG. 3, the correction signal EW has a waveform periodically changing in a parabolic form at the vertical scanning intervals. As shown by the solid line and the broken line in FIG. 3, the amplitude of the correction signal EW is controlled depending on the level of the amplitude control signal EWG. The level of the amplitude control signal EWG is determined so that forward and backward video signals at the top and bottom of the screen coincide on the time base.

The amplitude-controlled correction signal EW is added to the output signals of the low-pass filters 105 and 106 in the adders 107 and 108 in FIG. 2, so that the phase error generated in the horizontal AFC pulse ST by the effect of the EW correction circuit 116 is corrected.

Thus, the starting timing in the forward and retrace scanning at the top, center, and bottom of the screen can always be kept constant. As a result, in the bidirectional horizontal deflection apparatus according to the embodiment, zigzag vertical line interference can be cancelled in any positions of the top, center, and bottom of the screen.

Figure 4:
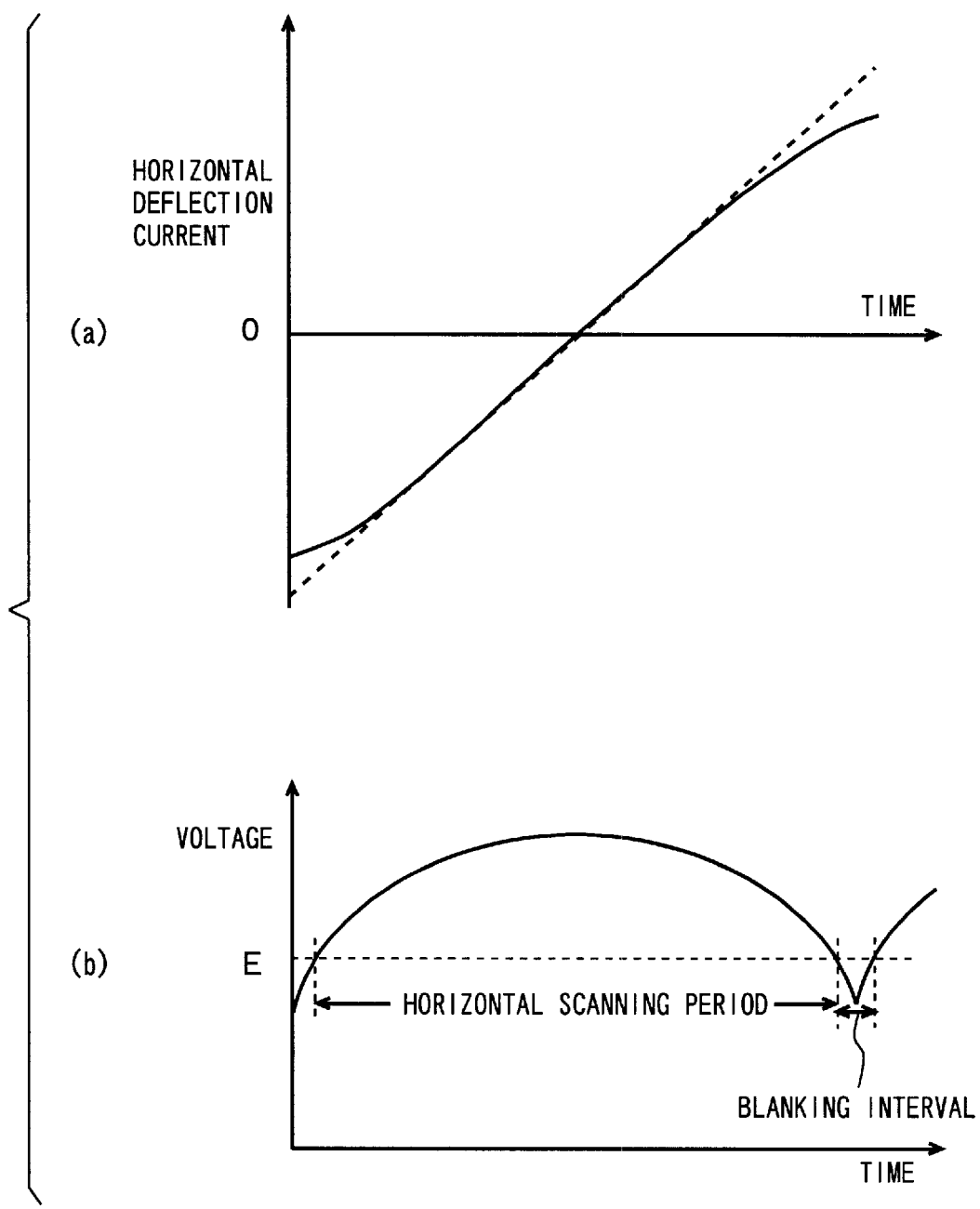
FIGS. 4A and 4B are charts for use in illustration of S correction.

FIGS. 4A and 4B are charts for use in illustration of S correction. FIG. 4A shows the waveform of a horizontal deflection current corrected into an S waveform by S correction, and FIG. 4B shows the waveform of voltage generated between both electrodes of the S correction capacitor 115. In order to correct distortion generated based on the difference in the electron beam movement between the central part and the peripheral part of the screen, the horizontal deflection current is increased at the central part and reduced at the peripheral part. The waveform of the horizontal deflection current by the S correction must be considered at the time of compensating for the distortion in the horizontal deflection current.

Figure 5:
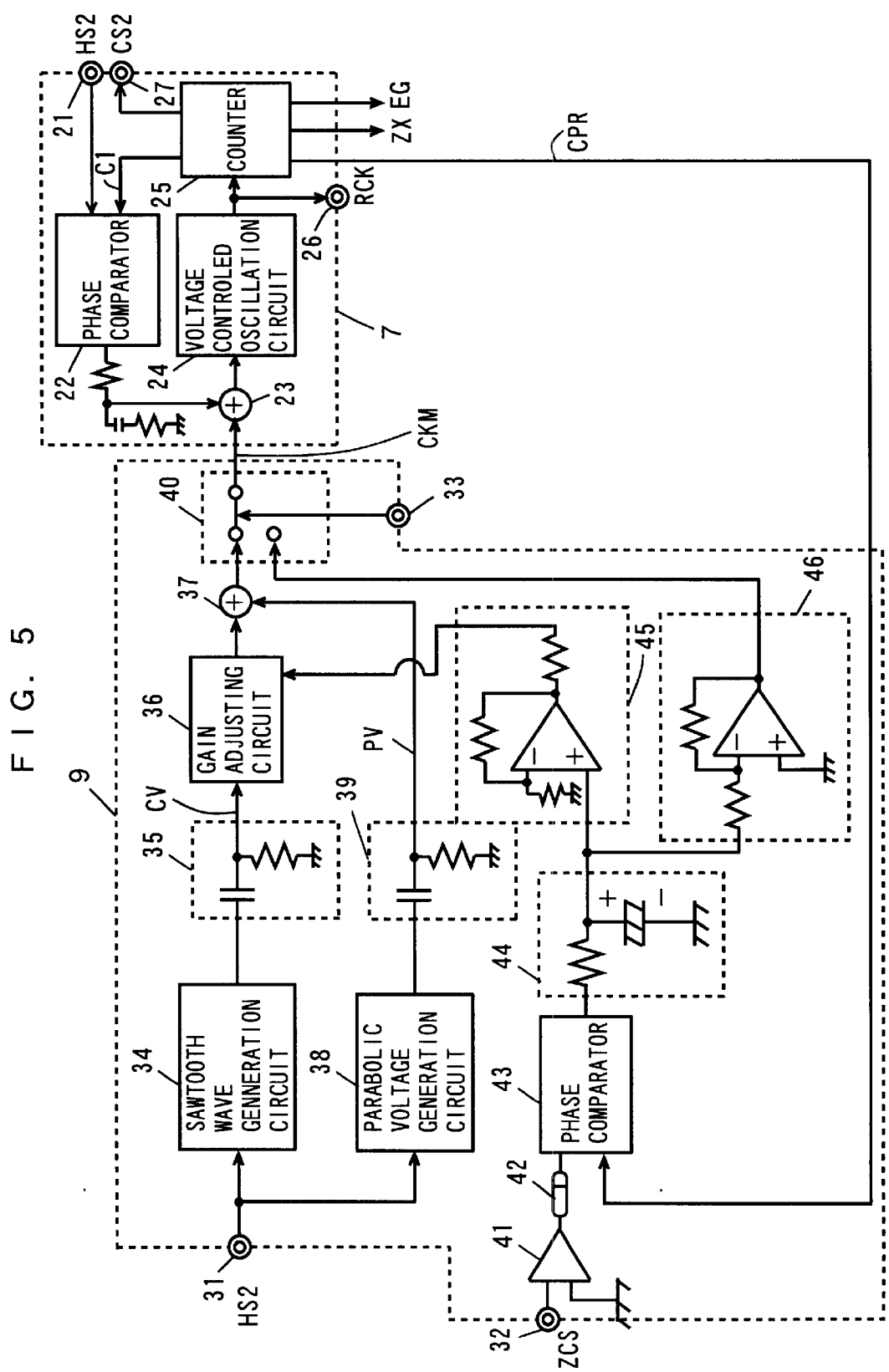
FIG. 5 is a block diagram showing one configuration of the reading PLL circuit and the clock modulation circuit in FIG. 1.

FIG. 5 is a block diagram showing one configuration of the reading PLL circuit 7 and the clock modulation circuit 9.

The reading PLL circuit 7 shown in FIG. 5 includes an input terminal 21, a phase comparator 22, an adder 23, a voltage controlled oscillation circuit 24, a counter 25, and output terminals 26 and 27.

The input terminal 21 is provided with the horizontal synchronizing signal HS2 from the writing PLL circuit 6 as shown in FIG. 1. The phase comparator 22 compares the phase of the horizontal synchronizing signal HS2 at the input terminal 21 and the phase of a first counter output signal C1 output from the counter 25 which will be described. The phase comparator 22 outputs voltage corresponding to the result of comparison to the adder 23 through a loop filter including a resistor and a capacitor.

The adder 23 adds the clock modulation signal CKM output from the clock modulation circuit 9 to the output voltage output from the phase comparator 22 and outputs the resulting signal to the voltage controlled oscillation circuit 24.

The voltage controlled oscillation circuit 24 generates the reading clock signal RCK having a frequency corresponding to the output voltage of the adder 23, and outputs the generated reading clock signal RCK to the counter 25 and the output terminal 26. The output terminal 26 is connected with the video memory 2 shown in FIG. 1.

The counter 25 counts pulses of the reading clock signal RCK output by the voltage controlled oscillation circuit 24 and outputs the first counter output signal C1 to the phase comparator 22 each time the pulses of the reading clock signal RCK corresponding to pieces of data to be read out in one horizontal scanning period are counted. The counter 25 outputs a second counter output signal to the clock modulation circuit 9 as the central pixel reading timing signal CPR each time the pulses of the reading clock signal RCK corresponding to half the number of pieces of data to be read in one horizontal scanning period are counted after the first counter output signal C1 is output. The counter 25 also outputs the second counter output signal produced by frequency-dividing the first counter output signal C1 into ½ as the second switching signal CS2 to the output terminal 27. The counter 25 also applies the video center signal ZX and the on timing signal EG to the horizontal deflection circuit 8. The output terminal 27 is connected with the video memory 2 and the horizontal deflection circuit 8 shown in FIG. 1.

The clock modulation circuit 9 includes input terminals 31 to 33, a saw-tooth wave generating circuit 34, differentiating circuits 35 and 39, a gain adjusting circuit 36, an adder 37, a parabolic voltage generation circuit 38, a switching circuit 40, a comparator 41, a delay element 42, a phase comparator 43, a low-pass filter 44, an amplifying circuit 45 and an inversion/level shift circuit 46.

The saw-tooth wave generating circuit 34 generates saw-tooth wave voltage in synchronization with the horizontal synchronizing signal HS2 at the input terminal 31 and outputs the generated signal to the differentiating circuit 35.

The differentiating circuit 35 differentiates the saw-tooth wave output from the saw-tooth wave generating circuit 34 and outputs correction voltage CV having a waveform corresponding to the waveform of the horizontal deflection current IH to the gain adjusting circuit 36.

The gain adjusting circuit 36 adjusts the level of the correction voltage CV based on the output signal of the amplifying circuit 45 which will be described, and outputs the resulting voltage to the adder 37.

Meanwhile, the parabolic voltage generation circuit 38 generates parabolic voltage in synchronization with the horizontal synchronizing signal HS2 at the input terminal 31 and outputs the generated signal to the differentiating circuit 39.

The differentiating circuit 39 differentiates the parabolic voltage output by the parabolic voltage generation circuit 38 and outputs correction parabolic voltage PV to the adder 37.

The adder 37 adds the correction voltage output from the gain adjusting circuit 36 and the correction parabolic voltage PV output by the differentiating circuit 39 and outputs the result to the switching circuit 40.

The switching circuit 40 switches the connection in response to a blanking signal supplied through the input terminal 33. More specifically, the switching circuit 40 outputs the output of the inversion/level shift circuit 46 which will be described as the clock modulation signal CKM to the adder 23 in the reading PLL circuit 7 during a blanking interval, and outputs the output signal of the adder 37 as the clock modulation signal CKM to the adder 23 during the period other than the blanking interval.

The input terminal 32 is supplied with the zero crossing signal ZCS from the integrating circuit 120 in FIG. 2. The comparator 41 compares the zero crossing signal ZCS at the input terminal 32 and the ground voltage. The comparator 41 then outputs to the delay element 42 high level voltage when the voltage level of the zero crossing signal ZCS is higher than 0V for example and low level voltage when the level of the zero crossing signal ZCS is lower than 0V.

The delay element 42 delays the output signal of the comparator 41 to be transferred to the phase comparator 43. The delay element 42 is adapted to change time delay according to the temperature around the horizontal deflection yoke 118 in FIG. 2 for example, so that zigzag vertical line interference caused by the temperature characteristic of the bidirectional horizontal deflection apparatus is corrected.

The phase comparator 43 compares the phase of the central pixel reading timing signal CPR output by the counter 25 and the phase of the output signal of the comparator 41 delayed by the delay element 42, and outputs an output signal in a level corresponding to the phase difference to the low-pass filter 44.

The low pass filter 44 removes the output signal from the phase comparator 43 of a signal component having a frequency higher than a prescribed frequency and outputs the resulting signal to the amplifying circuit 45 and the inversion/level shift circuit 46. Thus, the output signal of the phase comparator 43 is removed of noise.

The amplifying circuit 45 amplifies the output signal of the phase comparator 43 passed through the low-pass filter 44 at a prescribed amplifying ratio and outputs the amplified signal to the gain adjusting circuit 36.

The inversion/level shift circuit 46 inverts the output signal of the phase comparator 43 passed through the low-pass filter 44 and shifts the level of the output signal for output to the switching circuit 40.

Now, how to remove zigzag vertical line interference between forward and retrace scanning in the bidirectional horizontal deflection apparatus shown in FIG. 1 will be described in conjunction with FIGS. 6 to 7. FIG. 6 includes charts showing signals at parts of the bidirectional horizontal deflection apparatus in FIG. 1. The general operation of the bidirectional horizontal deflection apparatus will be now described in conjunction with FIG. 6.

For example, the image data VD1 shown in FIG. 6 at (a) is written in the video memory 2. The image data VD1 is read out from the video memory 2 in the same order as the writing order if the second switching signal CS2 shown in FIG. 6 at (b) is in a high level, and read out in the order reversed from the writing order if the second switching signal CS2 is in a low level. Thus, the image data VD2 read out and output from the video memory 2 is converted by the D/A converter 3, so that an analog signal VS shown in FIG. 6 at (c) corresponding to the reciprocating deflection method is provided.

In order to display an image at the CRT 4 using the video signal VS shown in FIG. 6 at (c), in the horizontal deflection circuit 8, the horizontal deflection current IH shown in FIG. 6 at (d) is supplied to a horizontal deflection coil 14 in response to the second switching signal CS2, and reciprocating deflection of an electron beam is performed. Thus, the timing of the electron beam being positioned at the end of a scanning line always coincides with the reading timings of the image data VD1 to be read out first and last in one horizontal scanning.

The timing of the horizontal deflection current IH in FIG. 6 at (d) being zero is detected by the magnetic field detection coil 119 and the integrating circuit 120, and the zero crossing signal ZCS shown in FIG. 6 at (e) is output from the horizontal deflection circuit 8 to the clock modulation circuit 9.

Meanwhile, the reading PLL circuit 7 outputs the reading clock signal RCK used to read out pixel data from the video memory 2 and the central pixel reading timing signal CPR as shown in FIG. 6 at (f) indicating the timing of reading pixel data in the center of the screen from the video memory 2. Therefore, the zero crossing signal ZCS indicating the timing of the electron beam passing the center and the central pixel reading timing signal CPR must be in phase.

In order to allow the phases to coincide, the clock modulation circuit 9 outputs the clock modulation signal CKM shown in FIG. 6 at (g) to the reading PLL circuit 7, and changes the frequency of the reading clock signal RCK. If the reading clock signal RCK has a higher frequency, the phase of the central pixel reading timing signal CPR advances, and conversely if the reading clock RCK has a lower frequency, the phase of the central pixel reading timing signal CPR is delayed. The frequency of the reading clock signal RCK in the reading PLL circuit 7 is thus changed, so that the zero crossing signal ZCS shown in FIG. 6 at (e) and the central pixel reading timing signal CPR shown in FIG. 6 at (f) are in phase.

Meanwhile, the horizontal deflection current IH shown in FIG. 6 at (d) is distorted with respect to the ideal current waveform denoted by the dotted line. Therefore, if the reading clock signal RCK in the reading PLL circuit 7 is modulated, and the pixels are vertically aligned in the center in the horizontal direction of the screen, zigzag vertical line interference cannot be completely removed between the left end and the center of the screen and between the right end and the center of the screen. Therefore, the clock modulation circuit 9 changes the ratio of the modulation of the reading clock signal RCK in one horizontal scanning period. To this end, the correction voltage CV as shown in FIG. 6 at (h) generated by the saw-tooth wave generation circuit 34 and the differentiating circuit 35 shown in FIG. 2 is used for generating the clock modulation signal CKM in FIG. 6 at (g). The modulation correction with the correction voltage CV will be later described.

The correction parabolic voltage PV generated by parabolic voltage generation circuit 38 and the differentiating circuit 39 is added to the correction voltage CV, the switching circuit 40 switches to the output voltage of the inversion/level shift circuit 46 during a blanking interval and the clock modulation signal CKM as shown in FIG. 6 at (g) is thus generated. The correction parabolic voltage PV shown in FIG. 6 at (i) is deformed corresponding to the distortion of the horizontal deflection current IH shown in FIG. 6 at (d) by the differentiating circuit 39. The correction parabolic voltage PV and the blanking signal for generating the clock modulation signal CKM will be later described.

Figure 7:
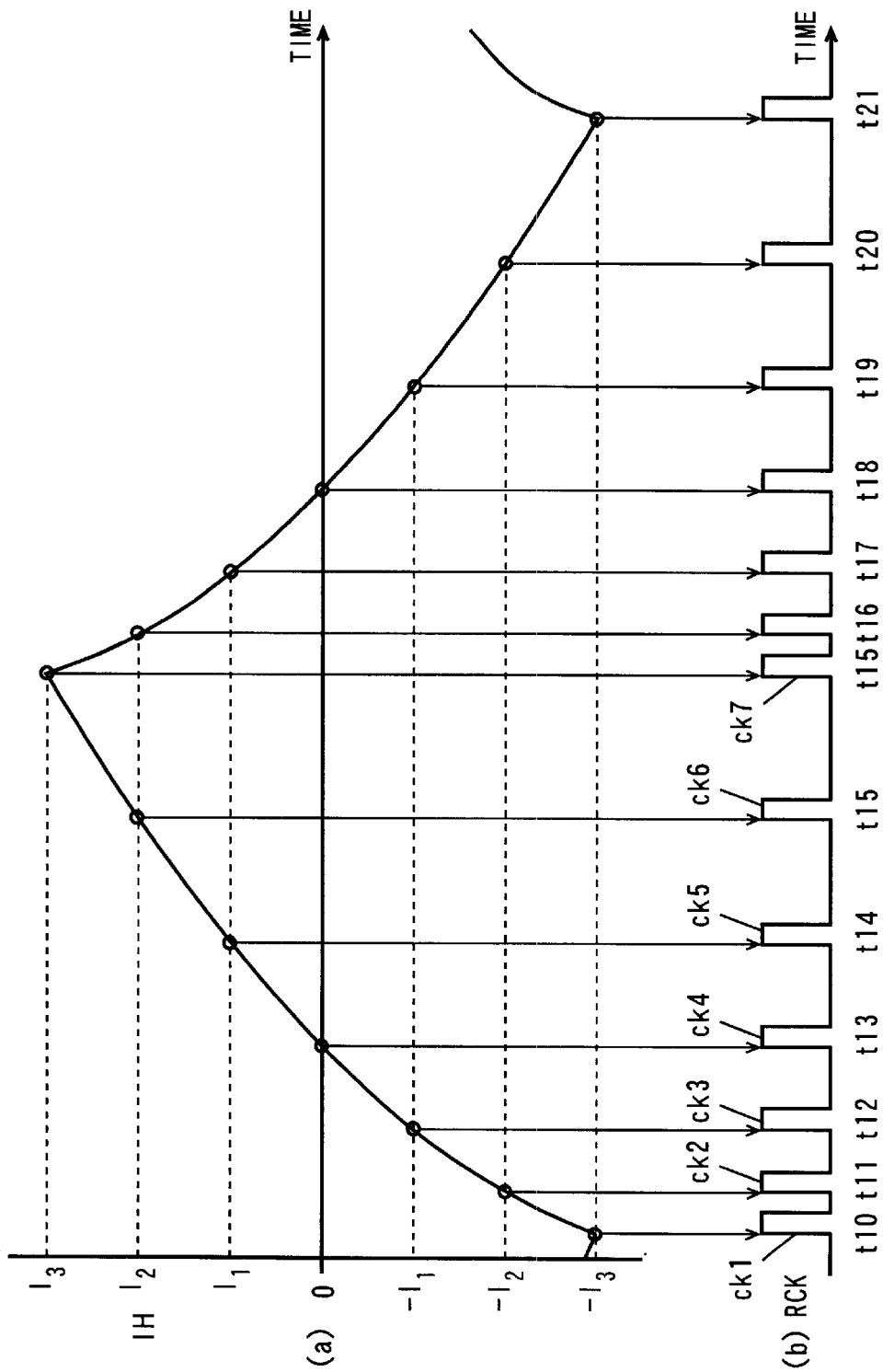
FIG. 7 is a chart for use in illustration of how zigzag vertical line interference is compensated in the bidirectional horizontal deflection apparatus in FIG. 1.

In FIG. 7, (a) shows an example of the current waveform of the horizontal deflection current IH passed across the horizontal deflection yoke 118. shown in FIG. 2. In FIG. 7, (b) shows an example of the waveform of the reading clock signal RCK.

In FIG. 7, an electron beam is irradiated on the left end in the horizontal direction of the screen when the horizontal deflection current IH is—$I_3$, on the center in the horizontal direction of the screen when the horizontal deflection current IH is zero and on the right end in the horizontal direction of the screen when the horizontal deflection current IH is $I_3$.

The phase comparator 22 shown in FIG. 5 compares the phase of the first counter output signal C1 at the counter 25 and the phase of the horizontal synchronizing signal HS2, and therefore the time for the horizontal deflection current IH to change from $-I_3$ to $I_3$ and the time for the horizontal deflection current IH to change from $I_3$ to $-I_3$ are equal. More specifically, the length of the trace scanning period and the length of the retrace scanning period are equal.

At time t10, the value of the horizontal deflection current IH is $-I_3$, and the electron beam is irradiated on the left end in trace scanning. At the time, data corresponding to the pixel at the left end of the screen is read out from the video memory 2 in the trace scanning in response to the reading clock signal RCK generated at time t10.

As the time passes from time t10 to t15, the value of the horizontal deflection current IH changes from $-I_3$ to 0 and then to $I_3$. During the period, reading clock pulses ck1 to ck7 to read out data are generated. The reading clock pulse ck1 is used to read out the data of a pixel on the left end in the horizontal direction of the screen, and coincides with the timing of the value of the horizontal deflection current IH becoming $-I_3$. The timings thus coincide because the horizontal deflection circuit 8 in FIG. 2 switches the gate pulses RD and TD in response to the second switching signal CS2 in the reading PPL circuit 7 in FIG. 1 in synchronization with the horizontal synchronizing signal HS2. Stated differently, the reading PLL circuit 7 allows the first counter output signal C1 produced by frequency-dividing the reading clock signal RCK to be in synchronization with the horizontal synchronizing signal HS2 by the phase comparator 22.

The reading clock pulse ck4 is used to read the data of a pixel in the center in the horizontal direction of the screen, and coincides with the timing of the value of the horizontal deflection current IH becoming zero. To this end, the frequency of the reading clock signal RCK is modulated by the clock modulation circuit 9. The degree of modulating the reading clock signal RCK is determined based on the clock modulation signal CKM applied from the clock modulation circuit 9 to the adder 23. With the clock modulation signal CKM, the central pixel reading timing signal CPR output from the counter 25 in the reading PLL circuit 7 and the zero crossing signal ZCS input to the clock modulation circuit 9 are in phase. Their phases are matched by the loop of the phase comparator 43, the low-pass filter 44, the amplifying circuit 45, the gain adjusting circuit 36, the adder 37, the switching circuit 40, the adder 23, the voltage controlled oscillation circuit 24 and the counter 25.

If for example the timing generated by the reading clock pulse ck4 is delayed from time t13 when the horizontal deflection current IH is zero, the voltage of the clock modulation signal CKM to be added at the adder 23 is increased, so that the frequency of the reading clock signal RCK output by the voltage controlled oscillation circuit 24 is increased. Conversely, if the timing of the reading clock pulse ck4 being generated is earlier than time t13 when the horizontal deflection current IH becomes zero, the voltage of the clock modulation signal CKM to be added at the adder 23 is reduced, so that the frequency of the reading clock signal RCK output by the voltage controlled oscillation circuit 24 is reduced.

The voltage level of the clock modulation signal CKM is adjusted by the gain adjusting circuit 36 based on the result of comparison by the phase comparator 43.

As described above, the reading clock pulses ck1, ck4 and ck7 coincide with the timings of the horizontal deflection current IH becoming $-I_3$, $0$, and $I_3$, respectively by the reading PLL circuit 7 and the clock modulation circuit 9. However, since the horizontal deflection current IH is distorted by various causes, the timings of generating the reading clock pulses ck2, ck3, ck5 and ck6 generated between the reading clock pulses ck1, ck4 and ck7 are preferably adjusted as well. Therefore, the clock modulation circuit 9 includes the saw-tooth wave generation circuit 34 and the differentiating circuit 35. The correction voltage CV generated by the saw-tooth wave generation circuit 34 and the differentiating circuit 35 has a waveform corresponding to a predicted current waveform of the horizontal deflection current IH distorted by the resistance component of the horizontal deflection coil 14.

Here, the correction voltage CV is provided by the saw-tooth wave generation circuit 34 and differentiating circuit 35, while voltage V represented by $V = A \cdot t^3$ may be generated by another configuration for example and used as the correction voltage CV. In the expression, A is a constant, V is voltage and t is time. Alternatively, the waveform of the horizontal deflection current IH may be obtained by experiments, and the waveform of the correction voltage CV may be determined based on the waveform. The waveform data of the corresponding voltage thus determined may be stored in a ROM (Read Only Memory), and the correction voltage CV may be generated based on the waveform data using a D/A converter.

Note that the waveform of the correction voltage CV is determined in view of distortion in the horizontal deflection current IH caused by S correction. As a result, the S correction is performed if the reading clock signal RCK is modulated.

The clock modulation circuit 9 supplements insufficient S correction and performs horizontal linearity correction by the parabolic voltage generation circuit 38 and the differentiating circuit 39. The horizontal deflection current IH having a distorted waveform cannot be suitably corrected only with parabolic voltage output by the parabolic voltage generation circuit 38, and therefore the differentiating circuit 39 is additionally provided. The minimum value of the parabolic voltage output by the parabolic voltage generation circuit 38 is moved to an earlier position on the time base by the differentiating circuit 39. Thus, the timing of the parabolic voltage PV being at the minimum value is substantially matched with the zero crossing timing of the horizontal deflection current IH. The parabolic voltage PV is added to the correction voltage CV output from the gain adjusting circuit 36, so that the insufficient S correction is supplemented, the horizontal linearity may be corrected and consumption power can be reduced.

When the phase of the central pixel reading timing signal CPR is, for example, delayed from the phase of the zero crossing signal ZCS as shown by the dotted line in FIG. 6 at (f), the clock modulation circuit 9 operates to raise the frequency of the reading clock signal RCK and let their phases coincide. If the reciprocating scanning is repeated in this state, zigzag vertical line interference is cancelled while the horizontal size is kept constant by the phase locked loop of the reading PLL circuit 7. However, during the period of the frequency modulation for thus matching the phases, the frequency is modulated and therefore the ending point of one horizontal scanning takes place early, which reduces the horizontal size, and the starting point of the next horizontal scanning is shifted to an earlier point on the time base. Therefore, the level of the clock modulation signal CKM output from the switching circuit 40 during a blanking interval is changed to correct the starting point of the next horizontal scanning to be substantially on the same horizontal coordinate. As a result, the inversion/level shift circuit 46 inverts the output signal of the phase comparator 43, and shifts the level of the output signal based on the phase difference between the zero crossing signal ZCS and the central pixel reading timing signal CPR.

Thus, by the bidirectional horizontal deflection apparatus according to the first embodiment, the timing of the horizontal deflection current being zero by the magnetic field detection coil 119 and the integrating circuit 120 is detected as the center passing timing in which the electron beam passes the center of the screen in the horizontal direction. The zero crossing signal ZCS is output as a signal indicating the center passing timing. The clock modulation signal CKM is applied to the reading PLL circuit 7 from the clock modulation circuit 9 so that the phase of the zero crossing signal ZCS and the phase of the central pixel reading timing signal CPR output by the reading PLL circuit 7 are matched. Thus, regardless of the distortion in the horizontal deflection current IH in the forward and retrace scanning, data of the pixel to be displayed in the center of the screen is read out in the timing of the electron beam passing the center of the screen in the horizontal direction.

Similarly to the conventional case, the horizontal synchronizing signal HS2 and the first counter output signal C1 of the counter 25 are in phase in the reading PLL circuit 7, the horizontal scanning period determined by the second switching signal CS2 to switch the horizontal deflection current IH is stable, and there is no zigzag vertical line interference at ends in forward and retrace scanning.

Consequently, the bidirectional horizontal deflection apparatus according to the first embodiment can remove the zigzag vertical line interference in a simple manner.

According to the embodiment, the horizontal deflection yoke 118 corresponds to the horizontal deflection coil, the horizontal output FET 112 to the first current supply circuit, and the horizontal output FET 111 to the second current supply circuit. The phase comparator 104, low-pass filter 106, the adder 108, and the trace scanning control circuit 110 form the first driving circuit, while the phase comparator 103, the low-pass filter 105, the adder 107 and the retrace scanning circuit 109 form the second driving circuit. Furthermore, the EW correction circuit 116 corresponds to the deflection current correction circuit, and the amplitude control circuit 125 corresponds to the driving timing correction circuit.

The phase comparator 104 corresponds to the first phase comparator, the low-pass filter 106 to the first low-pass filter, the adder 108 to the first adder, and the trace scanning control circuit 110 to the control circuit. The phase comparator 103 corresponds to the second phase comparator, the low-pass filter 105 to the second low-pass filter, the adder 107 to the second adder, and the retrace scanning control circuit 109 to the second control circuit.

The image data VD1 corresponds to the image information, the video memory 2 to the storing circuit, the writing clock signal WCK to the first clock signal, the writing PLL circuit 6 to the first clock generation circuit, the reading clock signal RCK to the second clock signal, the reading PLL circuit 7 to the second clock generation circuit, the magnetic field detection coil 119 and the integrating circuit 120 to the detection circuit and the reading PLL circuit 7 and the clock modulation circuit 9 to the phase control circuit.

Note that the low-pass filter 44 and the amplifying circuit 45 to transmit the output signal of the phase comparator 43 to the gain adjusting circuit 36 are circuits to prevent incorrect operation caused by noise or the low level of output signals from the phase comparator 43 and secure reliable operation. Therefore, zigzag vertical line interference can still be cancelled without the low-pass filter 44 and the amplifying circuit 45.

According to the first embodiment, the magnetic field detection coil 119 and the integrating circuit 120 are used as the screen center detection circuit, while a resister connected in series to the horizontal deflection coil 14 may be used.

The bidirectional horizontal deflection apparatus according to the first embodiment controls the phase of the reading clock signal RCK so that a prescribed umber of image data pieces VD1 are displayed from one end to the other end of each scanning line in forward and retrace scanning, and the pixel in the center of the screen in the horizontal direction is displayed in synchronization with the zero crossing signal ZCS generated by the magnetic field detection coil 119 and the integrating circuit 120. Meanwhile, the phase of the writing clock signal WCK may be controlled instead of the reading clock signal RCK, so that the above described display is made.

(Second Embodiment)

Figure 8:
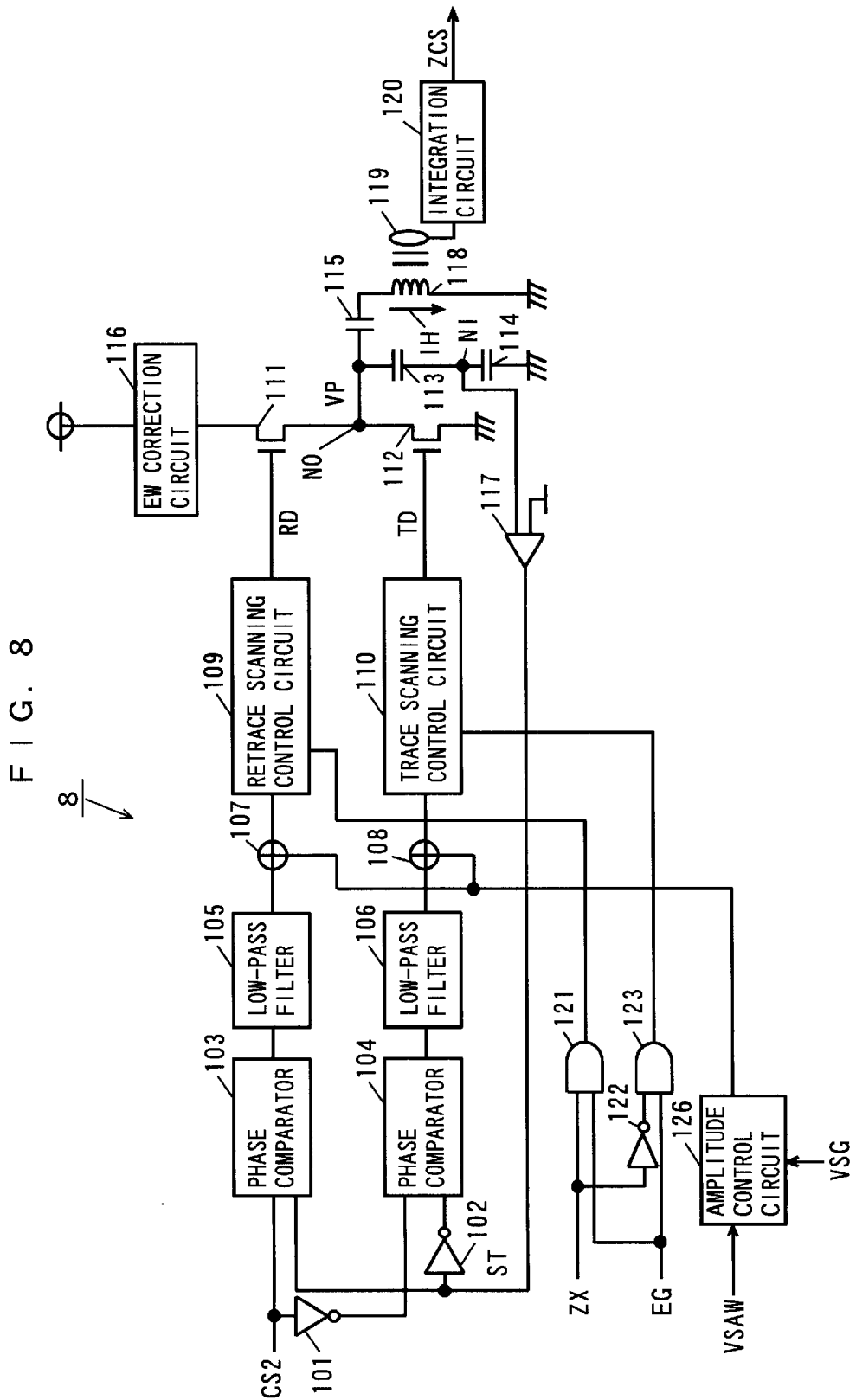
FIG. 8 is a circuit diagram showing the configuration of a horizontal deflection circuit in a bidirectional horizontal deflection apparatus according to a second embodiment of the present invention.

FIG. 8 is a circuit diagram showing the configuration of a horizontal deflection circuit in a bidirectional horizontal deflection apparatus according to a second embodiment of the present invention.

The horizontal deflection circuit 8 shown In FIG. 8 is different from the horizontal deflection circuit 8 in FIG. 2 in that in place of the amplitude control circuit 125 in FIG. 2, an amplitude control circuit 126 is provided. The other part of the horizontal deflection circuit 8 in FIG. 8 has the same configuration as that of the horizontal deflection circuit 8 in FIG. 2. The other part of the bidirectional horizontal deflection apparatus according to the second embodiment has the same configuration as that of the bidirectional horizontal deflection apparatus in FIG. 1. According to the embodiment, the amplitude control circuit 126 corresponds to the driving timing correction circuit.

The amplitude control circuit 126 is provided with a correction signal VSAW changing in a saw-tooth waveform at a vertical scanning interval and the amplitude control signal VSG. The amplitude control circuit 126 controls the amplitude of the correction signal VSAW based on the level of the amplitude control signal VSG, and applies an amplitude controlled output signal to the other input terminals of the adders 107 and 108.

Figure 9:
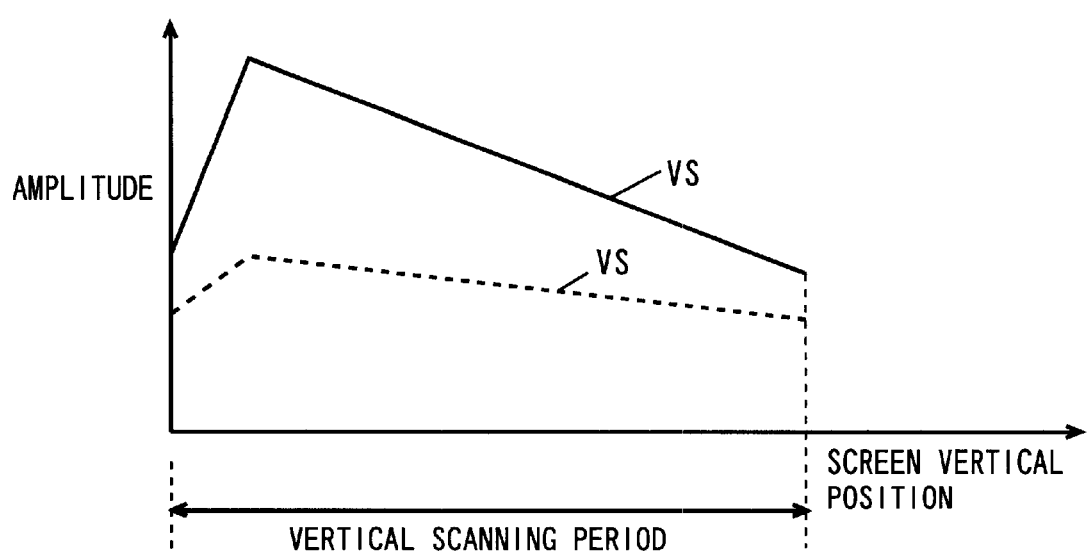
FIG. 9 is a waveform chart showing a correction signal applied to the amplitude control circuit in FIG. 8.
Figure 15:
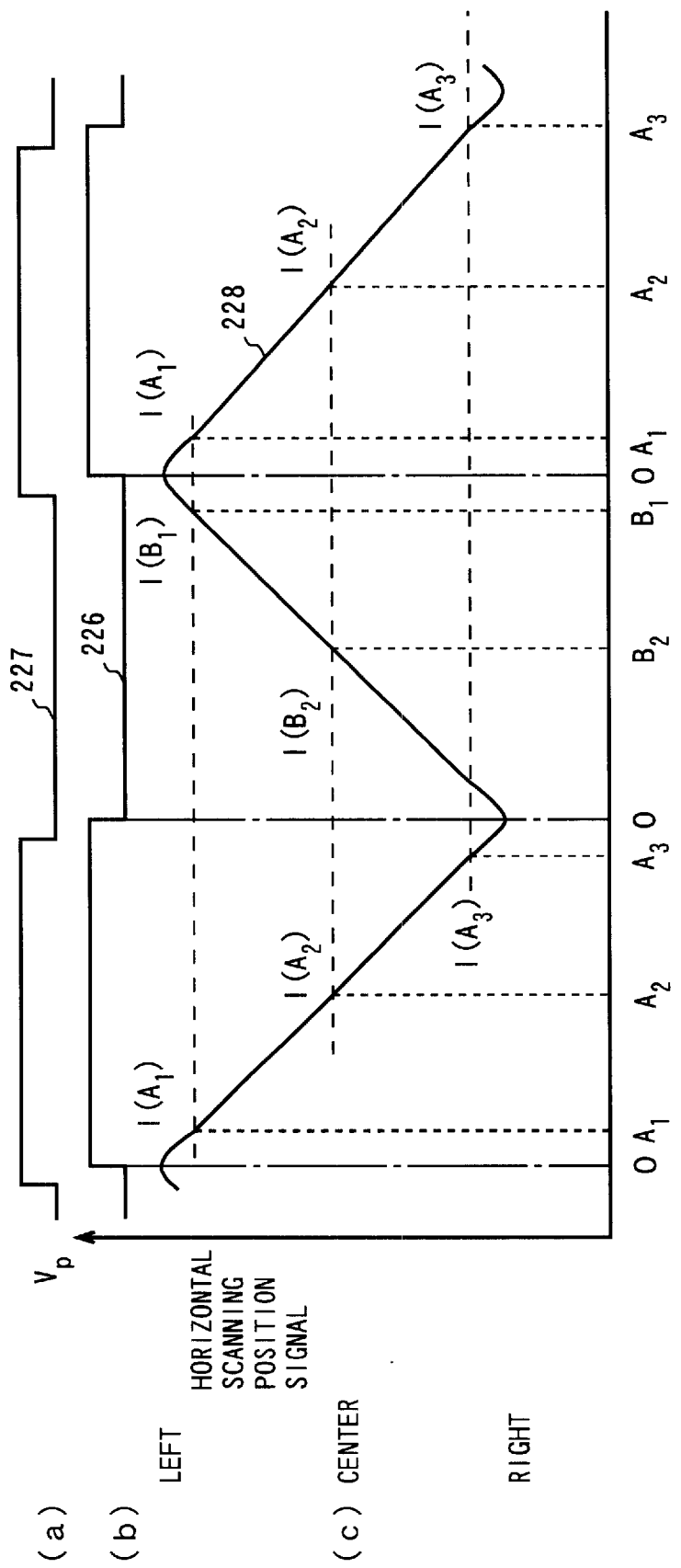
FIG. 15 is a waveform chart for use in illustration of the operation of a conventional zigzag vertical line interference automatic cancellation means.
Figure 16:
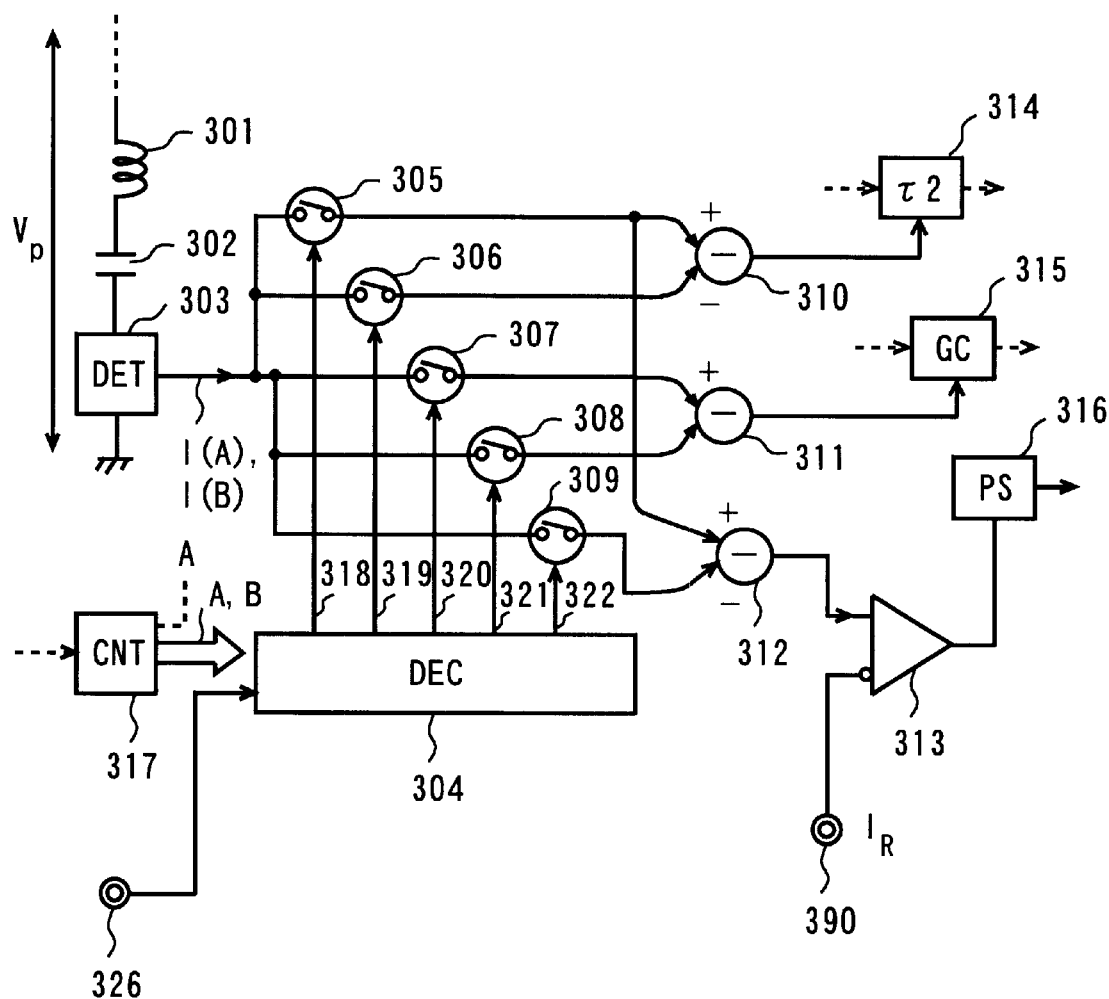
FIG. 16 is a diagram showing the configuration of the conventional zigzag vertical line interference automatic cancellation means.

FIG. 9 is a waveform chart showing the correction signal applied to the amplitude control circuit 126. As denoted by the solid line and the broken line in FIG. 9, the amplitude of the correction signal VSAW is controlled based on the level of the control signal VSG. The level of the control signal VSG is determined so that the forward and backward video signals at the top and bottom of the screen coincide on the time base. The amplitude controlled correction signal VSAW is added to the output signals of the low-pass filters 105 and 106 at the adders 107 and 108 in FIG. 8, so that the phase error generated in the horizontal AFC pulse ST by the effect of the vertical deflection current is corrected.

Thus, the starting timing in the forward and retrace scanning at the top, center, and bottom of the screen can always be kept constant. As a result, in the bidirectional horizontal deflection apparatus according to the embodiment, zigzag vertical line interference can be cancelled in any positions of the top, center, and bottom of the screen.

(Third Embodiment)

FIG. 10 is a circuit diagram showing the configuration of a horizontal deflection circuit in a bidirectional horizontal deflection apparatus according to a third embodiment of the present invention.

The horizontal deflection circuit 8 in FIG. 10 is different from the horizontal deflection circuit 8 in FIG. 2 in that the amplitude control circuit 126 in FIG. 8 is provided in addition to the amplitude control circuit 125 in FIG. 2 and an adder 127 is also provided. The configuration of the other part of the horizontal deflection circuit 8 in FIG. 10 is the same as that of the horizontal deflection circuit 8 in FIG. 2. The other part of the bidirectional horizontal deflection apparatus according to the third embodiment has the same configuration as that of the bidirectional horizontal deflection apparatus in FIG. 1.

The adder 127 adds the output signal of the amplitude control circuit 125 and the output signal of the amplitude control circuit 126 and applies an output signal indicating the result of the addition to the other input terminals of the adders 107 and 108.

At the adders 107 and 108 in FIG. 10, the amplitude controlled correction signal EW and the amplitude controlled correction signal VSAW are added to the output signals of the low-pass filters 105 and 106, so that the phase error generated in the horizontal AFC pulse ST by the effect of the EW correction circuit 116 and the effect of the horizontal deflection current is corrected.

Thus, the starting timing in forward and retrace scanning at the top, center, and bottom of the screen can always be kept constant. As a result, in the bidirectional horizontal deflection apparatus according to the embodiment, zigzag vertical line interference can be removed in any positions of the top, center, and bottom of the screen.

According to the embodiment, the amplitude control circuits 125 and 126 form the driving timing correction circuit. The correction signal VSAW corresponds to the third correction waveform, and the control signal VSG corresponds to the amplitude control signal. The correction signal EW corresponds to the second correction waveform and the control signal EWG corresponds to the amplitude control signal.

As in the foregoing, with the horizontal deflection circuit according to the present invention, a bidirectional horizontal deflection apparatus capable of removing zigzag vertical line interference in any positions of the top, center, and bottom of the screen can be provided.

Also by the bidirectional horizontal deflection apparatus according to the present invention, zigzag vertical line interference can be cancelled in a simple manner in any positions of the top, center, and bottom of the screen. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A horizontal deflection circuit for performing bidirectional scanning with an electron beam in the horizontal direction of a screen for displaying an image, comprising:
   a horizontal deflection coil;
   a first current supply circuit for supplying said horizontal deflection coil with first horizontal deflection current for forward horizontal deflection;
   a second current supply circuit for supplying said horizontal deflection coil with second horizontal deflection current for backward horizontal deflection;
   a first driving circuit for driving said first current supply circuit so that voltage generated by said first horizontal deflection current is in synchronization with a first timing signal indicating a trace scanning period;
   a second driving circuit for driving said second current supply circuit so that voltage generated by said second horizontal deflection current is in synchronization with a second timing signal indicating a retrace scanning period;
   a deflection current correction circuit for correcting said first horizontal deflection current and said second horizontal deflection current based on a first correction waveform periodically changing at vertical scanning intervals; and
   a driving timing correction circuit for correcting the driving timing of said first current supply circuit by the first driving circuit and the driving timing of said second current supply circuit by the second driving circuit based on a second correction waveform periodically changing at the vertical scanning intervals corresponding to said first correction waveform so that the horizontal positions of corresponding portions of forward and backward video signals coincide in each position in the vertical direction of the screen.

2. The horizontal deflection circuit according to claim 1, wherein
   said driving timing correction circuit controls horizontal deflection amplitudes by said first and second driving circuits at the vertical scanning intervals based on said second correction waveform.

3. The horizontal deflection circuit according to claim 1, wherein
   said driving timing correction circuit controls the amplitude of said second correction waveform based on a first amplitude control signal.

4. The horizontal deflection circuit according to claim 1, wherein
   said deflection current correction circuit comprises an east-west pincushion distortion correction circuit for correcting east-west pincushion distortion.

5. The horizontal deflection circuit according to claim 1, wherein
   said first and second correction waveforms periodically change in a parabolic form at the vertical scanning intervals.

6. The horizontal deflection circuit according to claim 1, wherein
   said first driving circuit comprises:
     a first phase comparator for outputting voltage based on the phase difference between said first timing signal and voltage generated by said first horizontal deflection current;
     a first low-pass filter for integrating the voltage output from said first phase comparator;
     a first adder for adding the output voltage of said first low-pass filter and the output voltage of said driving timing correction circuit and outputting the result; and
     a first control circuit responsive to a first trigger signal and the output signal of said first adder for turning on and off said first current supply circuit, and
   said second driving circuit comprises:
     a second phase comparator for outputting voltage based on the phase difference between said second timing signal and voltage generated by said second horizontal deflection current;
     a second low-pass filter for integrating the voltage output from said second phase comparator;
     a second adder for adding the output voltage of said second low-pass filter and the output voltage of said driving timing correction circuit and outputting the result; and
     a second control circuit responsive to a second trigger signal and the output signal of said second adder for turning on and off said second current supply circuit.

7. The horizontal deflection circuit according to claim 1, wherein
   said driving timing correction circuit corrects the driving timing of said first current supply circuit by the first driving circuit and the driving timing of said second current supply circuit by the second driving circuit based on a third correction waveform periodically changing at the vertical scanning intervals based on said second correction waveform and corresponding to the waveform of an interference signal so that the horizontal positions of corresponding portions of forward and backward video signals coincide in each position in the vertical direction of the screen.

8. The horizontal deflection circuit according to claim 7, wherein
   said driving timing correction circuit controls horizontal deflection amplitudes by said first and second driving circuits at the vertical scanning intervals based on the waveform of said interference signal.

9. The horizontal deflection circuit according to claim 7, wherein
   said driving timing correction circuit controls the amplitude of said third correction waveform based on a second amplitude control signal.

10. The horizontal deflection circuit according to claim 7, wherein
the waveform of said interference signal and said third correction waveform periodically change in a saw-tooth waveform at the vertical scanning intervals.

11. The horizontal deflection circuit according to claim 7, wherein
said interference signal is derived from vertical deflection current.

12. A horizontal deflection circuit for performing bidirectional scanning with an electron beam in the horizontal direction of a screen to display an image, comprising:
a horizontal deflection coil;
a first current supply circuit for supplying said horizontal deflection coil with first horizontal deflection current for forward horizontal deflection;
a second current supply circuit for supplying said horizontal deflection coil with second horizontal deflection current for backward horizontal deflection;
a first driving circuit for driving said first current supply circuit so that voltage generated by said first horizontal deflection current is in synchronization with a first timing signal indicating a trace scanning period;
a second driving circuit for driving said second current supply circuit so that voltage generated by said second horizontal deflection current is in synchronization with a second timing signal indicating a retrace scanning period; and
a driving timing correction circuit for correcting the driving timing of said first current supply circuit by the first driving circuit and the driving timing of said second current supply circuit by the second driving circuit based on a correction waveform changing at vertical scanning intervals corresponding to the waveform of an interference signal so that the horizontal positions of corresponding portions of forward and backward video signals coincide in each position in the vertical direction of the screen.

13. The horizontal deflection circuit according to claim 12, wherein
said driving timing correction circuit controls a horizontal deflection amplitude by said first and second driving circuits at the vertical scanning intervals based on the waveform of said interference signal.

14. The horizontal deflection circuit according to claim 12, wherein
said driving timing correction circuit changes the amplitude of said correction waveform based on an amplitude control signal.

15. The horizontal deflection circuit according to claim 12, wherein
the waveform of said interference signal and said correction waveform periodically change in a saw-tooth waveform at the vertical scanning intervals.

16. The horizontal deflection circuit according to claim 12, wherein
said first driving circuit comprises:
a first phase comparator for outputting voltage based on the phase difference between said first timing signal and voltage generated by said first horizontal deflection current;
a first low-pass filter for integrating the voltage output from said first phase comparator;
a first adder for adding the output voltage of said first low-pass filter and the output voltage of said driving timing correction circuit and outputting the result; and
a first control circuit responsive to a first trigger signal and the output signal of said first adder for turning on and off said first current supply circuit; and
said second driving circuit comprises:
a second phase comparator for outputting voltage based on the phase difference between said second timing signal and voltage generated by said second horizontal deflection current;
a second low-pass filter for integrating the voltage output from said second phase comparator;
a second adder for adding the output voltage of said second low-pass filter and the output voltage of said driving timing correction circuit and outputting the result; and
a second control circuit responsive to a second trigger signal and the output signal of said second adder for turning on and off said second current supply circuit.

17. A bidirectional horizontal deflection apparatus for performing bidirectional scanning with an electron beam in the horizontal direction of a screen, comprising:
a storing circuit for storing image information;
a first clock generation circuit for generating a first clock signal to write image information corresponding to forward and retrace scanning to said storing circuit;
a second clock generation circuit for generating a second clock signal to read out image information corresponding to forward and retrace scanning from said storing circuit;
a horizontal deflection circuit for deflecting an electron beam based on image information read out from said storing circuit forward and backward in the horizontal direction and forming a scanning line on the screen;
a detection circuit for detecting the timing of an electron beam being at a prescribed position substantially in the center in the horizontal direction of the screen and outputting a detection signal based on the result; and
a phase control circuit controlling the phase of said first or second clock signal generated by said first or second clock generation circuit so that a prescribed number of image information pieces are displayed from one end to the other end of each scanning line in forward and retrace scanning and image information corresponding to said prescribed position is displayed in synchronization with said detection signal generated by said detection circuit, and
said horizontal deflection circuit comprises:
a horizontal deflection coil;
a first current supply circuit for supplying said horizontal deflection coil with first horizontal deflection current for forward horizontal deflection;
a second current supply circuit for supplying said horizontal deflection coil with second horizontal deflection current for backward horizontal deflection;
a first driving circuit for driving said first current supply circuit so that voltage generated by said first horizontal deflection current is in synchronization with a first timing signal indicating a trace scanning period;
a second driving circuit for driving said second current supply circuit so that voltage generated by said second horizontal deflection current is in synchronization with a second timing signal indicating a retrace scanning period;
a deflection current correction circuit for correcting said first deflection current and second horizontal deflection current based on a first correction waveform periodically changing at vertical scanning intervals; and a driving timing correction circuit for correcting the driving timing of said first current supply circuit by the first driving circuit and the driving timing of said second current supply circuit by the second driving circuit based on a second correction waveform periodically changing at the vertical scanning intervals corresponding to said first correction waveform so that the horizontal positions of corresponding portions of forward and backward video signals coincide in each position in the vertical direction of the screen.

18. The bidirectional horizontal deflection apparatus according to claim 17, wherein said deflection current correction circuit comprises an east-west pincushion distortion correction circuit for correcting east-west pincushion distortion.

19. A bidirectional horizontal deflection apparatus for performing bidirectional scanning with an electron beam in the horizontal direction of a screen, comprising:

a storing circuit for storing image information;

a first clock generation circuit for generating a first clock signal to write image information corresponding to forward and retrace scanning to said storing circuit;

a second clock generation circuit for generating a second clock signal to read out image information corresponding to forward and retrace scanning from said storing circuit;

a horizontal deflection circuit for deflecting an electron beam based on image information read out from said storing circuit forward and backward in the horizontal direction and forming a scanning line on the screen;

a detection circuit for detecting the timing of an electron beam being at a prescribed position substantially in the center in the horizontal direction of the screen and generating a detection signal based on the result; and a phase control circuit for controlling the phase of said first or second clock signal generated by said first or second clock generation circuit so that a prescribed number of image information pieces are displayed from one end to the other end of each scanning line in forward and retrace scanning, and image information corresponding to said prescribed position is displayed in synchronization with said detection signal generated by said detection circuit, said horizontal deflection circuit comprises:

a horizontal deflection coil;

a first current supply circuit for supplying said horizontal deflection coil with first horizontal deflection current for forward horizontal deflection;

a second current supply circuit for supplying said horizontal deflection coil with second horizontal deflection current for backward horizontal deflection;

a first driving circuit for driving said first current supply circuit so that voltage generated by said first horizontal deflection current is in synchronization with a first timing signal indicating a trace scanning period;

a second driving circuit for driving said second current supply circuit so that voltage generated by said second horizontal deflection current is in synchronization with a second timing signal indicating a retrace scanning period; and a driving timing correction circuit for correcting the driving timing of said first current supply circuit by said first driving circuit and the driving timing of said second current supply circuit by said second driving circuit based on a correction waveform periodically changing at vertical scanning intervals corresponding to the waveform of an interference signal so that the horizontal positions of corresponding portions of forward and backward video signals coincide in each position in the vertical direction of the screen.

20. The bidirectional horizontal deflection apparatus according to claim 19, wherein said interference signal is derived from vertical deflection current.

* * * * *